(12) United States Patent
Janecek et al.

(10) Patent No.: US 9,618,003 B2
(45) Date of Patent: *Apr. 11, 2017

(54) HIGH EFFICIENCY TRANSVERSE FLUX MOTOR FAN

(71) Applicant: Electric Torque Machines Inc., Flagstaff, AZ (US)

(72) Inventors: Thomas F Janecek, Flagstaff, AZ (US); Tyler Williams, Flagstaff, AZ (US); Morgan Conklin, Flagstaff, AZ (US); John Dyer, Flagstaff, AZ (US)

(73) Assignee: Electric Torque Machines Inc., Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,823

(22) PCT Filed: Jan. 27, 2015

(86) PCT No.: PCT/US2015/013007
§ 371 (c)(1),
(2) Date: Jun. 22, 2015

(87) PCT Pub. No.: WO2015/089518
PCT Pub. Date: Jun. 18, 2015

(65) Prior Publication Data
US 2015/0369252 A1    Dec. 24, 2015

Related U.S. Application Data

(63) Continuation-in-part of application No. 14/101,415, filed on Dec. 10, 2013, which is a
(Continued)

(51) Int. Cl.
*F04D 25/06* (2006.01)
*F04D 25/08* (2006.01)
(Continued)

(52) U.S. Cl.
CPC ....... *F04D 25/088* (2013.01); *F04D 25/0606* (2013.01); *F04D 25/082* (2013.01);
(Continued)

(58) Field of Classification Search
CPC .. F04D 25/082; F04D 25/088; F04D 25/0606; F04D 25/06; H02K 2/145;
(Continued)

(56) References Cited

U.S. PATENT DOCUMENTS

| 6,244,821 B1 | 6/2001 | Boyd et al. |
| 7,396,212 B1 | 7/2008 | Parker |

(Continued)

FOREIGN PATENT DOCUMENTS

WO    2013132775 A1    9/2013

*Primary Examiner* — William H Rodriguez
*Assistant Examiner* — Christopher Brunjes
(74) *Attorney, Agent, or Firm* — Invention To Patent Services; Alex Hobson

(57) ABSTRACT

A high efficiency transverse flux motor fan utilizes a transverse flux motor that can provide torque to drive fan blades at a reduced weight over conventional induction and brushless DC motors. A fan incorporating a transverse flux motor may be a residential ceiling fan or high volume low speed fan. Transverse flux motors are ideal for these applications as they have a higher efficiency at low revolutions per minute. A transverse flux motor may have a stator utilizing a ring shaped lamina that has extending members that form a coil channel. A lamina may be a unitary piece of material that is formed from a sheet of metal, thereby providing a very lightweight stator assembly. An exemplary fan may provide an airflow efficiency of more than about 236 L/s*W, (500 CFM/watt), an essential airflow density of more than about 2.36 L/s*g, (5 CFM/gram) and a power density of about 150 W/kg or more.

22 Claims, 27 Drawing Sheets

Related U.S. Application Data continuation-in-part of application No. 14/259,959, filed on Apr. 26, 2014, now Pat. No. 9,360,020.

(51) Int. Cl.

| | | |
|---|---|---|
| *H02K 1/14* | (2006.01) | |
| *H02K 3/32* | (2006.01) | |
| *H02K 7/14* | (2006.01) | |
| *H02K 15/02* | (2006.01) | |
| *H02K 21/14* | (2006.01) | |
| *H02K 21/22* | (2006.01) | |

(52) U.S. Cl.
 CPC ............. *H02K 1/145* (2013.01); *H02K 3/325* (2013.01); *H02K 7/14* (2013.01); *H02K 15/022* (2013.01); *H02K 21/145* (2013.01); *H02K 21/227* (2013.01); *H02K 2213/03* (2013.01); *Y10T 29/49009* (2015.01)

(58) Field of Classification Search
 CPC ........ H02K 3/325; H02K 7/14; H02K 15/022; H02K 21/145; H02K 21/227; H02K 2213/03; Y10T 29/49009
 See application file for complete search history.

(56) References Cited

U.S. PATENT DOCUMENTS

| | | | |
|---|---|---|---|
| 2006/0255668 A1* | 11/2006 | Chen | H02K 1/145 310/67 R |
| 2011/0062817 A1* | 3/2011 | Makiyama | H02K 1/145 310/216.054 |
| 2011/0165002 A1 | 7/2011 | Noble | |
| 2011/0169365 A1* | 7/2011 | Calley | H02K 21/227 310/156.02 |
| 2012/0086303 A1 | 4/2012 | Hsu | |
| 2013/0270928 A1* | 10/2013 | Nord | H02K 1/145 310/12.26 |

* cited by examiner

| Motor | BLDC3 | BLDC2 | BLDC1 | Classic (Induction) | Example 1 |
|---|---|---|---|---|---|
| Stator Diam. (mm) | 120 | 132 | 85 | 145 | 183 |
| Air-gap (mm) | 0.8 | 0.8 | 0.9 | 0.4 | 0.75 |
| Stack height (mm) | 24 | 20 | 30 | 13.6 | 17 |
| Copper gauge (awg) | 25 | 28 | 28 | 29 | 24 |
| Copper mass (g) | 571 | 608 | 354 | 318 | 294 |
| Phase resistance (ohm) | 14 | 60 | 35 | N/A | 4.6 |
| Motor-controller Weight (g) | 3515 | 3629 | 2268 | 3402 | TBD |
| Rotor OD (mm) | 140 | 155 | 100 | 165 | 195 |
| Back iron mass (g) | 340 | 363 | 240 | 567 | 145 |
| Stator iron mass (g) | 1134 | 1270 | 567 | 1148 | 251 |
| Total motor steel (g) | 1474 | 1633 | 807 | 1715 | 396 |
| Magnet mass (g) | 399 | 322 | 218 | | 68 |
| stator and coil | 1705 | 1878 | 921 | 1466 | 545 |
| Total Essential Components | 2444 | 2563 | 1379 | 2033 | 758 |

FIG. 30

| Fan | Power (W) | CFM | Diam. (in) | CFM/W | CFM/Classic |
|---|---|---|---|---|---|
| Olivier (BLDC3) | 34 | 6977 | 70 | 205 | 100 |
| Kingsbury (BLDC2) | 29 | 8286 | 70 | 285 | 118 |
| Hathaway (BLDC1) | 29 | 5609 | 52 | 193 | 108 |
| Classic (Induction) | 59 | 5187 | 52 | 87 | 100 |
| Example 1 | | | | | |

FIG. 31

| Motor | BDC | BDC | BLDC | CBSAC (Induction) | Example 1 |
|---|---|---|---|---|---|
| Continuous Available Torque (N-m) | 1.2 | 1.1 | 0.9 | 0.5 | 1 |
| Kt Torque constant (N-m/Amp), RMS | 4.1 | 3.7 | 3.2 | 1.5 | 1.4 |
| Km Motor constant (Kt/√W) | 0.63 | 0.28 | 0.31 | N/A | 0.38 |
| Power Output (W) | 14 | 12.5 | 11.8 | 9 | >12 |
| Motor Efficiency* % | 60 | 60 | 60 | 16 | 65-70 |
| System Efficiency* % | 43 | 39 | 35 | 16 | 50 |
| Required supply power (Watts) | 49 | 40 | 35 | 59 | 24 |

FIG. 32

| Motor | BDC | BDC | BLDC | CBSAC (Induction) | Example 1 |
|---|---|---|---|---|---|
| Copper mass (g)/N-m | 476 | 553 | 393 | 636 | 294 |
| Total motor steel (g)/N- | 1228 | 1485 | 897 | 3430 | 396 |
| Magnet mass (g)/N-m | 333 | 293 | 242 |  | 68 |
| Total Essential g/N-m | 2037 | 2330 | 1532 | 4066 | 758 |

FIG. 33

HIGH EFFICIENCY TRANSVERSE FLUX MOTOR FAN

CROSS REFERENCE TO RELATED APPLICATIONS

This application is a national stage entry application filed under 35 U.S.C §371 and claims the benefit of, and priority to PCT patent application no. US/2015/013007 filed on Jan. 27, 2015 and entitled High Efficiency Transverse Flux Motor Fan, which claims the benefit of U.S. patent application Ser. No. 14/101,415, filed on Dec. 10, 2013 and entitled Transverse Flux Stator Geometries, and U.S. patent application Ser. No. 14/259,959, filed on Apr. 23, 2014 and entitled Self-Cooling Fan Assembly; the entirety of all applications are incorporated herein by reference.

BACKGROUND OF THE INVENTION

Field of the Invention

The present invention relates to fans and particularly high efficiency ceiling fans driven by a transverse flux motor.

Background

Fans are used in a wide variety of applications and most often are configured to move air in an effort to cool a room or object. Ceiling fans have become common place in homes and buildings and many of them run for long periods of time or continuously. Ceiling fans are driven by electric motors that are not very energy efficient, especially at the relatively low rotational speeds and comprise a large amount of metal. In addition, high volume low speed (HVLS) fans have become more widely used to cool large spaces, such as poultry farms, industrial areas including manufacturing areas, warehouses, and the like. These fans are typically configured to run at lower speeds than conventional home ceiling fans. Electric motors used to drive the HVLS fans have lower efficiency at low speeds and therefore are often times running well below their peak efficiency speeds.

Fans are also used to cool a wide variety of objects such as data centers and electronic components, such as microprocessors, for example. Many fans used to cool these objects generate a considerable amount of heat, thereby contributing to the heat that needs to be dissipated in these rather confined spaces.

The U.S. Department of Energy (DOE) will be placing electrical energy consumption regulations on ceiling fans, pursuant to the Energy Policy and Conservation Act (EPCA). Many of the current technologies used in ceiling fans will most likely not meet these standards and new, more efficient drive motors are needed. As described starting on page 53 of RIN: 1904-AC87, Energy Conversion Standard Rulemaking Framework Document for Ceiling Fans and Ceiling Fan Light Kits, published on Mar. 8, 2013 by the U.S. Department of Energy, the Office of Energy Efficiency and Renewable Energy Building Technologies Program:

> The most common ceiling fan motor is a single-phase induction motor (permanent-split capacitor type) with an external rotor. The efficiency of such motors can be improved by increasing the size of (or the quality of steel used in) the stator and rotor stack, improving the lamination design, increasing the cross section of copper wiring, or operating the fan at reduced speed through capacitor speed control.
>
> Most induction motors are mounted to the fan blades directly. This configuration is known as direct-drive and means that the fan and motor rotate at the same speed. In principle, ceiling fans could attach the fan blades to the motor via a geared mechanism that allows the fan blades to rotate at a different speed than the motor (a technology used in many industrial fans). This would enable higher motor speeds for a given fan RPM, which could increase overall efficiency.
>
> The most efficient ceiling fans on the market have brushless direct current (BLDC) motors. BLDC motors are permanent magnet synchronous alternating current (AC) motors driven by a converter plus inverter combination control system. In this configuration, the motor displays characteristics of direct current motors; thus, they are called brushless direct current motors. Because there is no electrical current flowing in the rotor of a BLDC motor, there are no rotor energy losses, thereby resulting in greater efficiency. While a typical ceiling fan has an efficiency of about 40 Liters per second per Watt (L/s*W), (86 CFM/W), fans that have a BLDC motor are capable of efficiency ratings of more than 142 L/s*W, (300 CFM/W). These fans tend to be higher-end products, and the increase in efficiency is likely attributable not only to the motor type but also to other design features (e.g., the blade shape and number of blades). Another advantage of these motors is that they tend to be smaller and make less noise than those found in traditional ceiling fan motors. One disadvantage of BLDC motors is that the lifetime of the motor may be less than the lifetime of an induction motor due to the electronic controls required to run the BLDC motor.

Motors are typically designed for high efficiency, high power density, and low cost. Brushless DC motors require complicated windings that require special equipment and add additional manufacturing costs. Most brushless DC motors have relatively few poles, such as four to eight. The complicated winding required limits the number of poles that can practically be designed into a brushless DC motor. While some motors are generally complicated in their assembly, so as to achieve higher performance characteristics, a design utilizing fewer components, or a well-engineered assembly, may provide a superior motor solution at a lower price point.

There exists a need for a fan that is highly efficient, efficient at low speeds, requires less material content, is lighter weight, generates less heat, can be easily manufactured in high volume and is affordable. The cost of most of the high volume fans currently being assembled today is in the material content. Electric motor production is highly automated and therefore labor and tooling are typically a low percentage of the overall cost of manufacturing. Reducing material content, such as the metal and magnets required will directly reduce the cost of the motor.

SUMMARY OF THE INVENTION

The invention is directed to fans comprising a transverse flux motor. Any suitable type of fan may be driven by a transverse flux motor, as described herein. In an exemplary embodiment, a ceiling fan is configured with a high efficiency transverse flux motor. An exemplary fan comprising a transverse flux motor, as described herein, can provide an airflow efficiency of more than about 142 L/s*W, (300 CFM/W), more than about 236 L/s*W, (500 CFM/W), or more than about 330 L/s*W, (700 CFM/W). In addition, a transverse flux motor may require much less raw material than a conventional induction or brushless DC motor. An exemplary fan comprising an exemplary transverse flux motor, as described herein, can provide an essential airflow density of more than about 1.89 liters per second per gram (L/s*g), (4 CFM/gram), more than about 2.36 L/s*g, (5 CFM/gram) or even more than about 2.83 L/s*g, (6 CFM/gram) wherein the fans have blade diameter less than about, 1.83 m or 72 in. The essential airflow density is the ratio of the airflow output to the weight of the essential motor components that consists of the stator, rotor, coil and in some embodiments the back-iron. In yet another exemplary embodiment, a transverse flux motor configured in a fan provides a power density of about 100 W/kg or more, about 125 W/kg or more, about 150 W/kg, about 200 W/kg or more and any range between and including the power densities provided. In addition, the torque magnet and total steel densities, or the ratio of the continuous available torque to the mass of the magnet and total motor steel, respectively, is significantly higher than those of conventional motors.

As used herein, a "transverse flux motor" may be any electrical motor wherein magnetic flux paths have sections where the flux is generally transverse to a rotational plane of the motor. In an exemplary embodiment, when a magnet and/or flux concentrating components are on a rotor and/or are moved as the electrical motor operates, the electrical motor may be a pure "transverse" flux motor. In another exemplary embodiment, when a magnet and/or flux concentrating components are on a stator and/or are held stationary as the electrical motor operates, the electrical motor may be a pure "commutated" flux motor. As is readily apparent, in certain configurations a "transverse flux motor" may be considered to be a "commutated flux motor" by fixing the rotor and moving the stator, and vice versa. Moreover, a coil may be fixed to a stator, alternatively, a coil may be fixed to a rotor. For brevity, the term transverse flux motor will be used to describe a motor that is a pure transverse flux motor and a pure commutated flux motor or any combination thereof.

A transverse flux motor with a high pole count, or number of poles within a single phase, and low resistance provides efficient power output at low speed and thereby enables a direct drive motor, with no gearing, for fan applications and particularly HVLS fans. HVLS fans require a high continuous power output or watts, such as 200 watts or more, 400 watts or more, 600 watts or more, 900 watts or more, or 1200 watts or more, for example. As described herein, brushless DC motors typically have four to eight poles and gearing is necessary to provide the torque required for HVLS fans. HVLS fans typically require a torque of about 10 N-m or more, 50 N-m or more, about 100 N-m or more, about 180 N-m or more and any range between and including the torque values listed. Gearing reduces efficiency and overall performance of the system. In an exemplary embodiment, a transverse flux motor, as described herein, is configured as a direct drive motor to drive a fan, such as an HVLS fan, as it can provide the required power output without the need of additional gearing. In a direct drive motor configuration, the fan blades may be attached directly, or coupled, to the rotor of a transverse flux motor, as described herein, and the rotor may be configured as an outer rotor. A direct drive motor configuration, as described herein, incorporates a transverse flux motor that drives the fan blades one revolution for every revolution of the motor and requires no gearing.

A transverse flux motor, as described herein, may have any suitable pole count including, but not limited to, about 30 or more, about 50 or more, about 70 or more, about 100 or more, about 120 or more and any range between and including the pole counts listed. A transverse flux motor, as described herein, does not require the complicated winding configuration of other motor types and therefore higher pole counts are more easily produced and produced at a lower manufacturing cost.

Another important metric for an electric motor is the ratio of the continuous torque versus the volume of the motor, or volumetric torque density. As shown in FIG. 32, transverse flux motors have a much higher volumetric torque density than conventional brushless DC motors. The increase is on the order of three to six times. Continuous torque is defined as the amount of torque a motor can produce without any supplemental cooling and in one embodiment includes only conventionally air cooled motors and excludes water cooled motors. A standard metric for determining maximum continuous torque is the amount of torque produced by a motor in a 40° C. environment wherein the motor case remains below 80° C. Many motors have a high peak power output but would overheat and fail if operated at or near the peak power output level for too long. Transverse flux motors, as described herein, are capable of providing a high continuous torque, or power output, without overheating as conventional motors often do. The volume of the motor as used in the volumetric torque density metric, is defined in one embodiment as the volume of the electro-active motor components, or the components of the motor that produce torque including the rotor, stator and coil. In another embodiment, the volume of the motor is defined as the essential components of the motor, including the stator, the rotor, and the coil. Any suitable method of measuring the motor volume may be used, including water displacement. A transverse flux motor having a volume of approximately 2800 cm$^3$ produces a continuous torque of more than 80 N-m, which is more than four times greater the continuous torque produced by a similarly sized BLDC motor. A transverse flux motor, as described herein, may have a volumetric torque density of about 0.006 N-m/cm$^3$ or more, about 0.01 N-m/cm$^3$ or more, about 0.02 N-m/cm$^3$ or more, about 0.03 N-m/cm$^3$ or more, and any range between and including the values provided. This high continuous torque output enables a transverse flux motor to be configured as a directed drive motor for a fan, wherein no additional gearing is required to drive the fan blades. The fan blades may be attached directly to or otherwise coupled to the rotor wherein one revolution of the rotor spins the fan blades one revolution The transverse flux motors, as described herein, are capable of providing a continuous power output, or watts of power without overheating as conventional motors often do. Continuous power output, or continuous watts as used herein, means that the motor can run essentially non-stop at the indicated continuous output level with no supplemental cooling. Many motors have a high peak power output but would overheat and fail if run at or near the peak power output level for too long. A transverse flux motor, as described herein, may be configured to produce continuous output power of about 200 watts or more, about 400 watts or more, about 600 watts or more and any range between and including the continuous power output levels described. An essentially continuous power density is the ratio of the continuous power output to the weight of the essential motor components, as described herein. A transverse flux motor, as described herein may produce at least 200 continuous watts of torque, or at least 400 continuous watts of torque or at last 600 continuous watts of torque.

This application is related to an enhancement of the technology disclosed in U.S. patent application Ser. No. 13/797,671, now U.S. Pat. No. 8,836,196 which claims the benefit of U.S. patent application Ser. No. 13/291,373, now U.S. Pat. No. 8,405,275, which itself claims priority from provisional applications 61/453,075, 61/414,781, 61/414,769, and 61/414,774. Each of these applications is incorporated herein by reference in its entirety.

In one embodiment, the fan, as described herein, is a ceiling fan or a non-portable device that is suspended from a ceiling for circulating air via the rotation of fan blades. A ceiling fan may be a high volume low speed, HVLS, fan that comprises relatively long fan blades that rotate at a relatively low speed. An HVLS fan generally has a fan blade diameter in excess of 2.1 m (7 ft) and may have a diameter in excess of 3.0 m (10 ft), 4.6 m (15 ft) or 6.1 m (20 ft) and any range between the fan blade diameters listed. A HVLS fan may be configured to rotate at relatively low speeds between 50 revolutions per minute (rpm) and generally no more than 100 rpm. In one embodiment, a fan, as described herein, is a residential ceiling fan that has a blade diameter of no more than 1.83 m (72 in). It is to be understood that a residential fan, as described herein, may be implemented in many locations and environments other than a residence and this term is merely used for convenience.

In another embodiment, a fan, as described herein, is an electronic enclosure cooling fan and may be configured within an electronic device, such as a computer, or server, for example. In another embodiment, a fan, as described herein, is configured to ventilate an enclosure that may comprise one or more electronic devices. The fan may be configured external to the electronic devices, such as servers and processors, for example. A fan, as described herein, may be used to move any type of fluid, such as air, water, coolant, or any type of liquid.

According to one aspect of this disclosure, an electrical motor includes a rotor for rotation about a rotational axis, a coil arranged circumferentially with respect to and encircling the rotational axis, and a stator assembly. In an exemplary embodiment, an electric motor, as described herein is configured with the rotor located radially inward from the stator assembly. The stator assembly includes a lamina structure comprising a stem portion and a plurality of radially extending members integral therewith. The extending members may be configured to form a plurality of opposing extending members about the coil. A first set of extending members may be configured on a first side of the coil and the second set of extending members may be configured on a second and opposing side of the coil. The extending members may be configured in an alternating configuration with a first extending member configured on a first side of the coil and the two adjacent extending members configured on the second side of the coil. The electrical motor may be a transverse flux motor or a commutated flux motor.

A lamina structure may be ring shaped having a generally planar configuration and may comprise an aperture that is centrally located. In an exemplary embodiment, the stem portion is centrally located and may extend around the aperture, and the radially extending members may extend out from the stem portion. In another exemplary embodiment, a stem portion may be configured on the outer portion of the ring shaped lamina structure and the radially extending members may extend in toward the center. In this embodiment, the inwardly radially extending members terminate at the aperture. A ring shaped lamina may be a unitary piece of material wherein radially extending members have a bent configuration to accommodate placement of a coil between a first side and a second side.

In one embodiment, a fan comprises a transverse flux motor that comprises a unique stator assembly having a ring shaped lamina structure. The ring shaped lamina structure comprises a stem portion and a plurality of radially extending members integral with said stem portion and configured to form a plurality of opposing extending members about a coil. The lamina may be a planar piece of material such a metal sheet and in an exemplary embodiment the lamina is a unitary piece of material, wherein the plurality of radially extending members alternate from one side of a coil to an opposing side of a coil. A lamina may be stamped from a single sheet of material that is planar and the extending members may be formed, such as by bending, to configure the extending members on either side of a coil. In another embodiment, the ring shaped lamina structure comprises two lamina that are magnetically coupled together over the stem portion. The ring shaped lamina structure, as described herein eliminates the need for a return element and therefore reduces cost, reduces weight, and reduces magnetic flux losses.

A transverse flux motor comprising a ring shaped lamina stator may be configured with the plurality of radially extending members extending out from an inner stem portion or in from an outer stem portion. In one embodiment, the fan blades are directly coupled with an outer rotating rotor of a transverse flux motor. In another embodiment, the fan blades are coupled to the stator and the rotor is configured within the ring shaped rotor.

A lamina structure, such as a ring shape lamina may comprise one or more electrical segmentations. An electrical segmentation may be a gap cut, or slit in the lamina that extends between two adjoining radially extending members and substantially through a magnetic flux path portion of the stem portion. An electrical segmentation gap will substantially reduce eddy currents.

Extending members may be bent at their extended ends to form a tooth. In another embodiment, a separate tooth may be coupled with an extended end of an extending member. For example, a powdered metal tooth may be attached to the extended end of extending members. A tooth formed from a bent portion of the extended end of the extended member may be configured substantially perpendicular to the extending member and alternating teeth may form a coil channel. A coil may be located and retained within a coil channel. The tooth, or extended ends of a stator may be configured with a coil space, or space between opposing stator teeth, that is large enough to allow insertion of a coil therethrough. In an exemplary embodiment, a coil space is formed in the rotational axis between a first and second set of teeth, whereby the coil space is configured for placement of a coil into a coil channel through said coil space. The stator teeth may be configured to extend at least partially over a coil that is located within a coil channel. In an exemplary embodiment, a coil in inserted into a coil channel through a coil space and subsequently the coil space is reduced by pressing the two opposing teeth toward each other.

A lamina, and more particularly the configuration of teeth may be configured to have a phase offset. For example, a first tooth and an adjacent second stator tooth in a first set of stator teeth may be separated, center to center, by a first angular distance, wherein one or more remaining stator teeth in the first set of stator teeth are each separated, center to center, by a second angular distance. The second angular distance being different from the first angular distance, and wherein the first angular distance is computed with a phase offset computed as a fraction of an even distribution angular distance of the first set of stator teeth.

A tooth may include one or more hood portions coupling sides of the head portion to the planar portion. The hood portions may be sloped or may have an angled configuration, or may include a combination of slopes and angles.

An electrical motor, as described herein, may have such low losses that an aluminum coil may be used instead of traditional copper and thereby provide a lower cost motor.

An electric motor, as described herein, may be a single phase or multi-phase motor. A plurality of ring shaped lamina structures may be stacked adjacent to each other to form a three-phase motor, for example.

An electric motor, as described herein, may comprise one or more flexible magnets. In one embodiment, a back iron comprises a flexible magnet and this flexible magnet may be configured radially outward around the stator. In an exemplary embodiment, an electric motor, as described herein, comprises a motor housing and a back-iron magnet is coupled with the housing.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a," "an," and "the" include plural referents unless the context clearly dictates otherwise.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
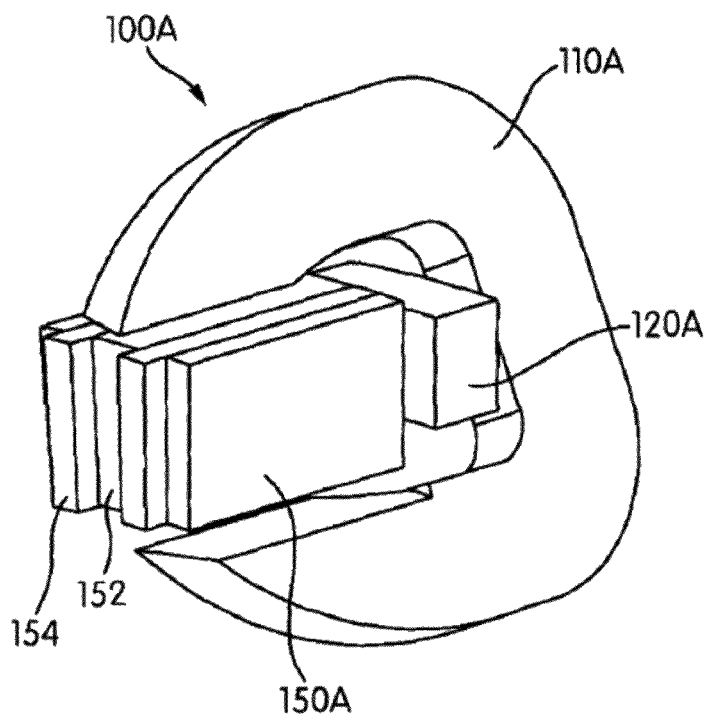

FIG. 1A illustrates an exemplary commutated flux machine in accordance with an exemplary embodiment.

Figure 1B:
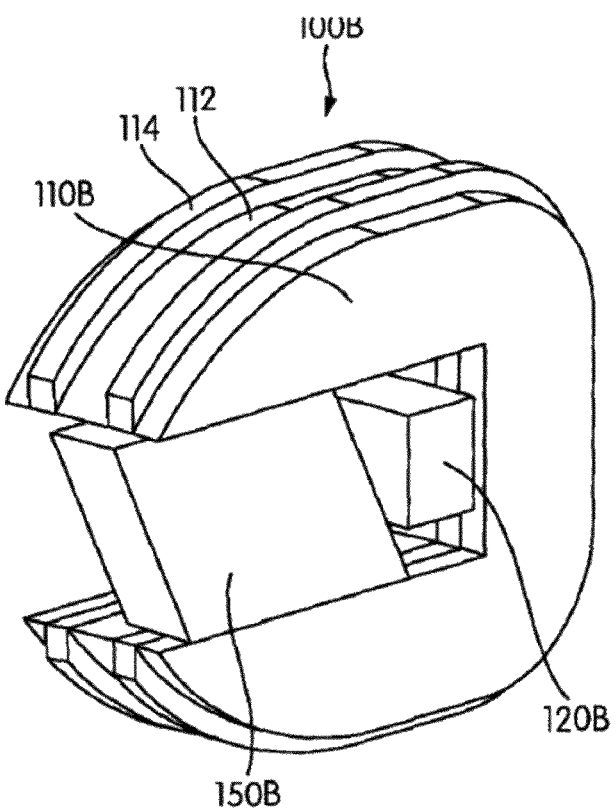

FIG. 1B illustrates an exemplary commutated flux machine in accordance with an exemplary embodiment.

Figure 2A:
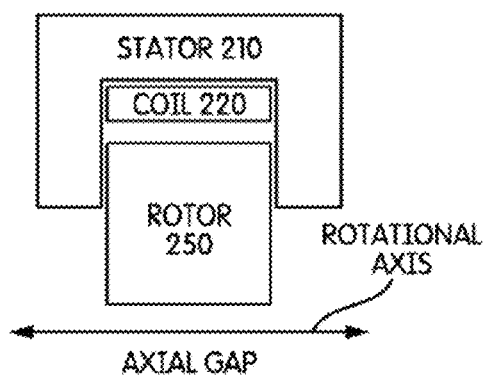

FIG. 2A illustrates an exemplary axial gap configuration in accordance with an exemplary embodiment.

Figure 2B:
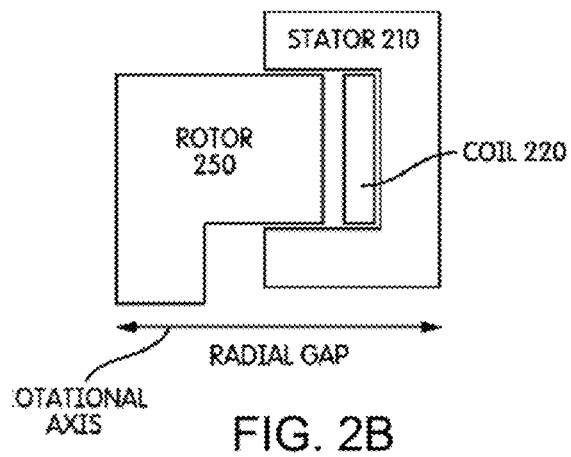

FIG. 2B illustrates an exemplary radial gap configuration in accordance with an exemplary embodiment.

Figure 3A:
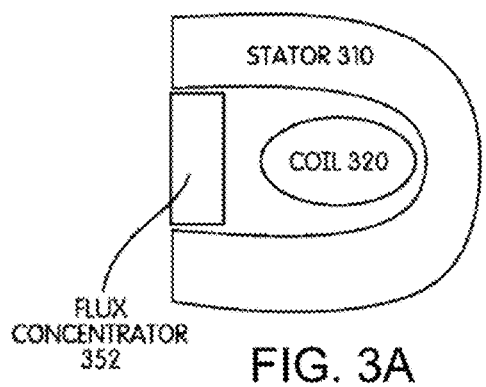

FIG. 3A illustrates an exemplary cavity engaged configuration in accordance with an exemplary embodiment.

Figure 3B:
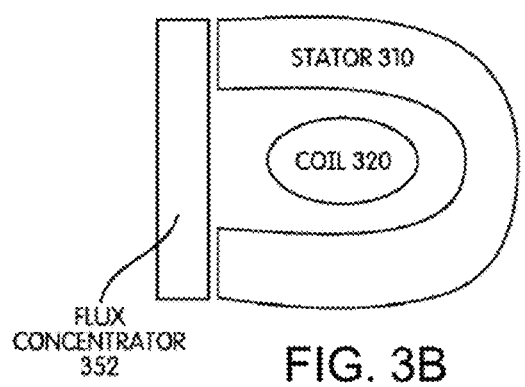

FIG. 3B illustrates an exemplary face engaged configuration in accordance with an exemplary embodiment.

Figure 3C:
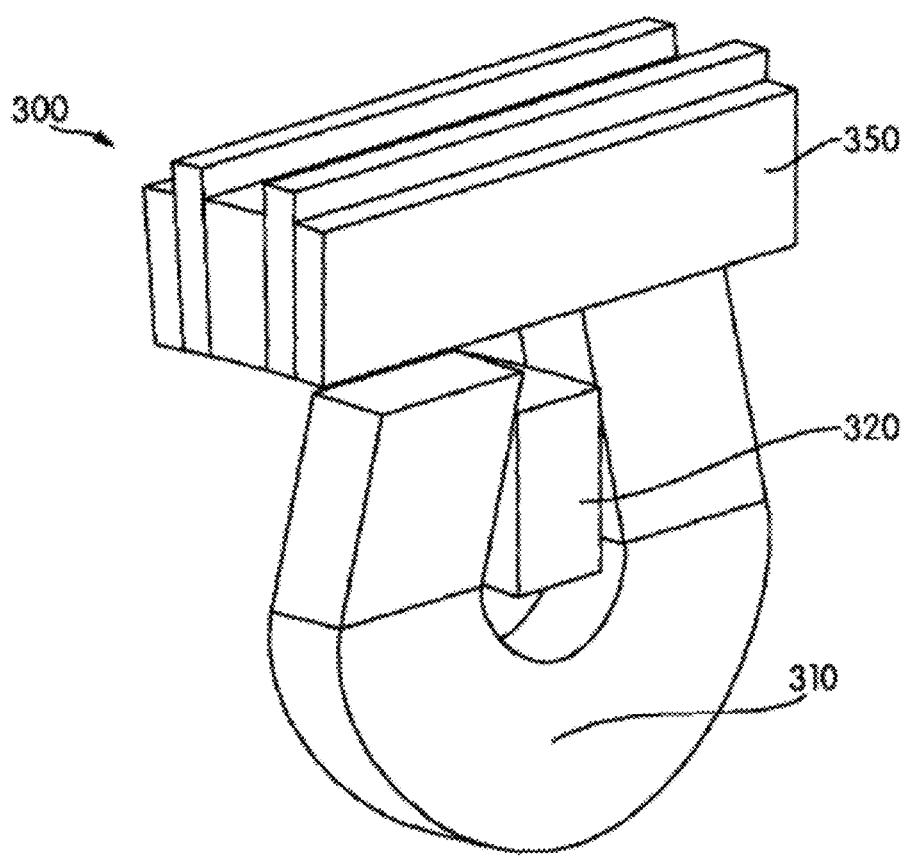

FIG. 3C illustrates an exemplary face engaged transverse flux configuration in accordance with an exemplary embodiment.

Figure 4:
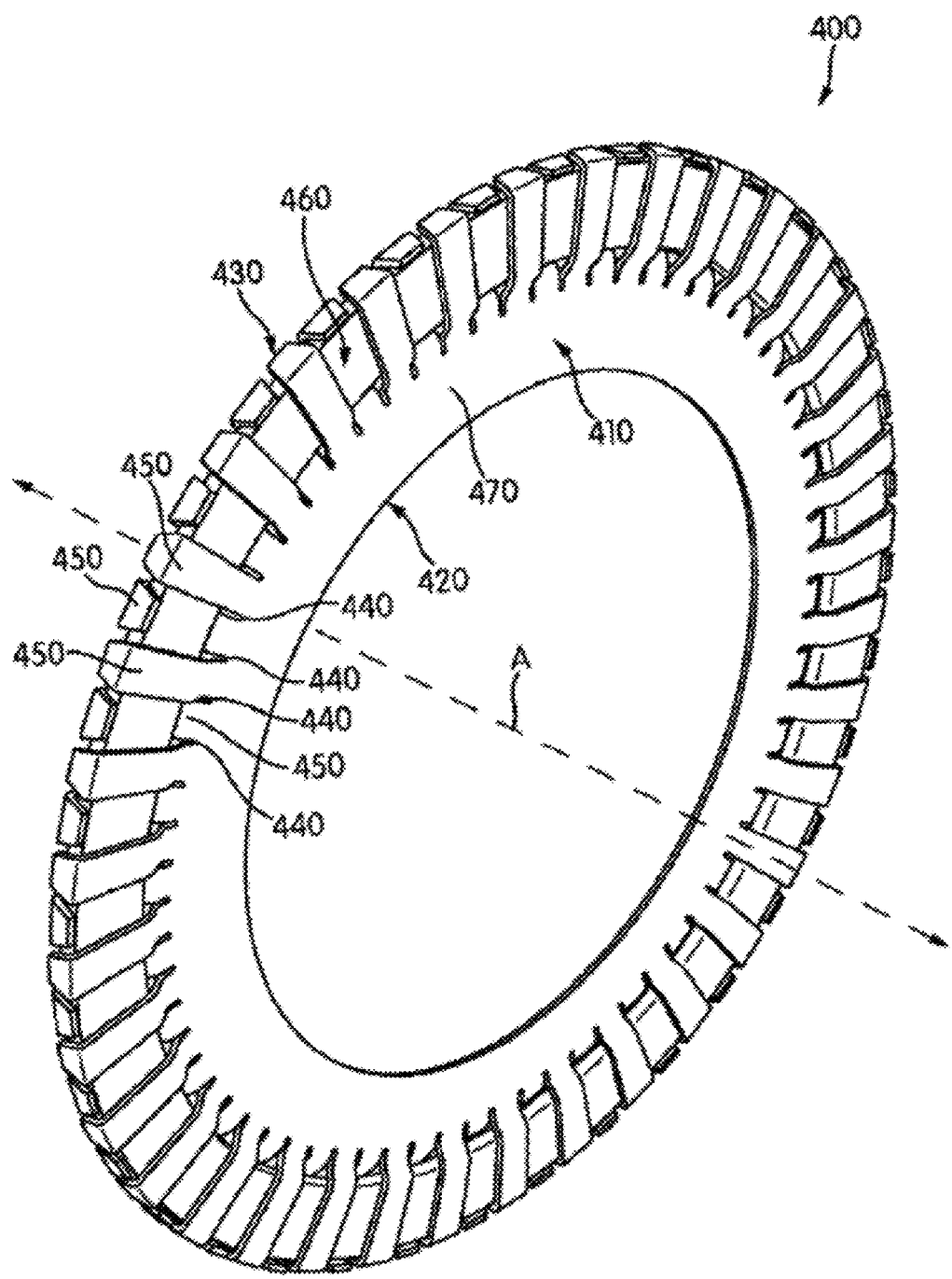

FIG. 4 illustrates an embodiment of a transverse flux stator of the present disclosure.

Figure 5:
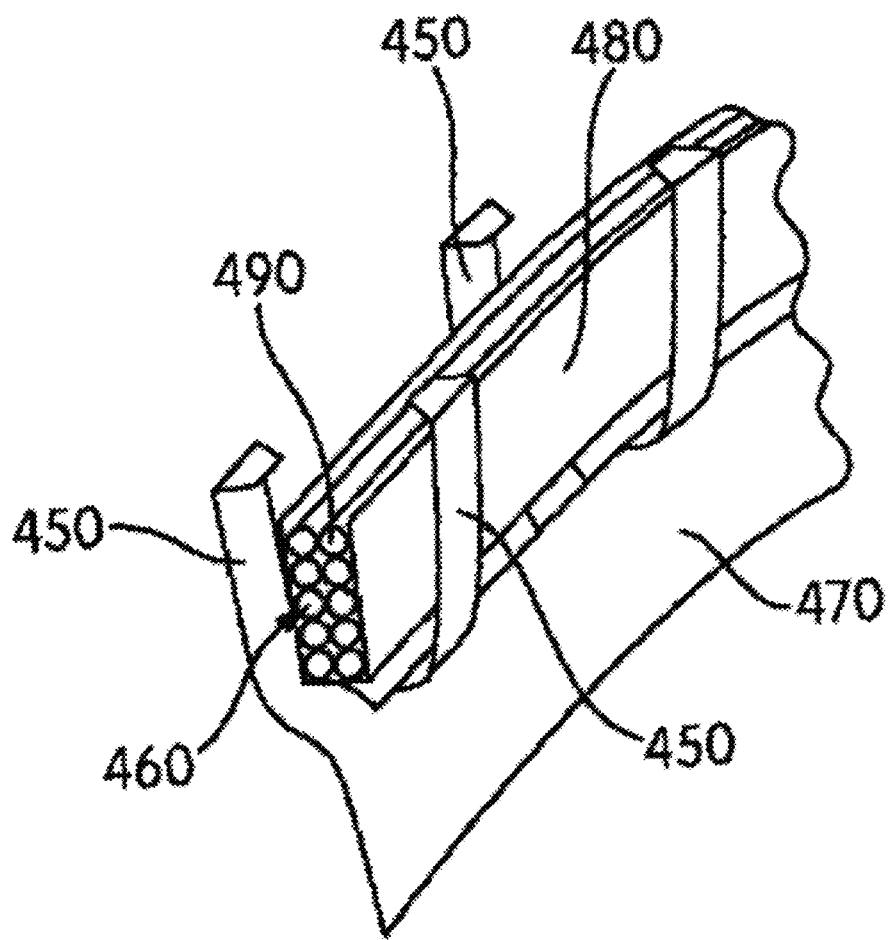

FIG. 5 illustrates a reduced sectional view of the stator of FIG. 4 during an assembly thereof.

Figure 6:
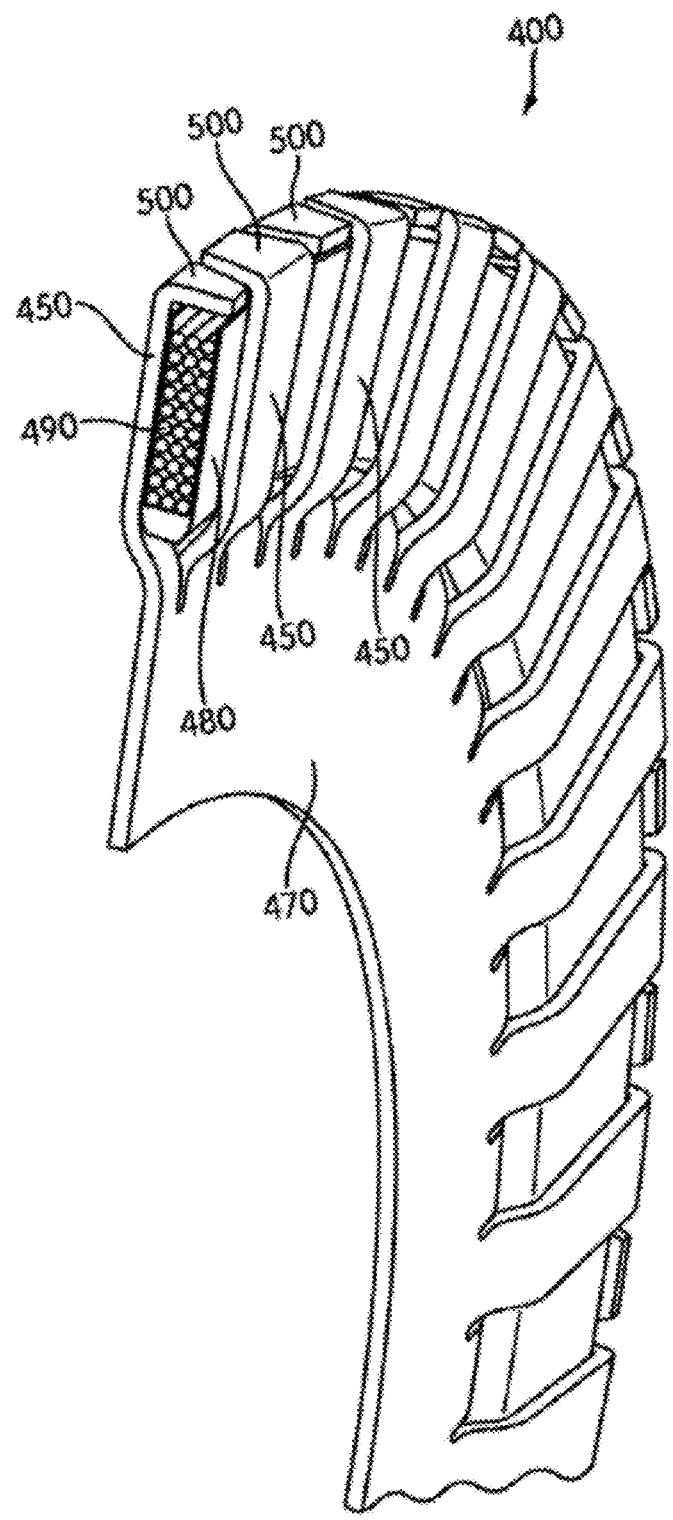

FIG. 6 illustrates a sectional view of the stator of FIG. 4.

Figure 7:
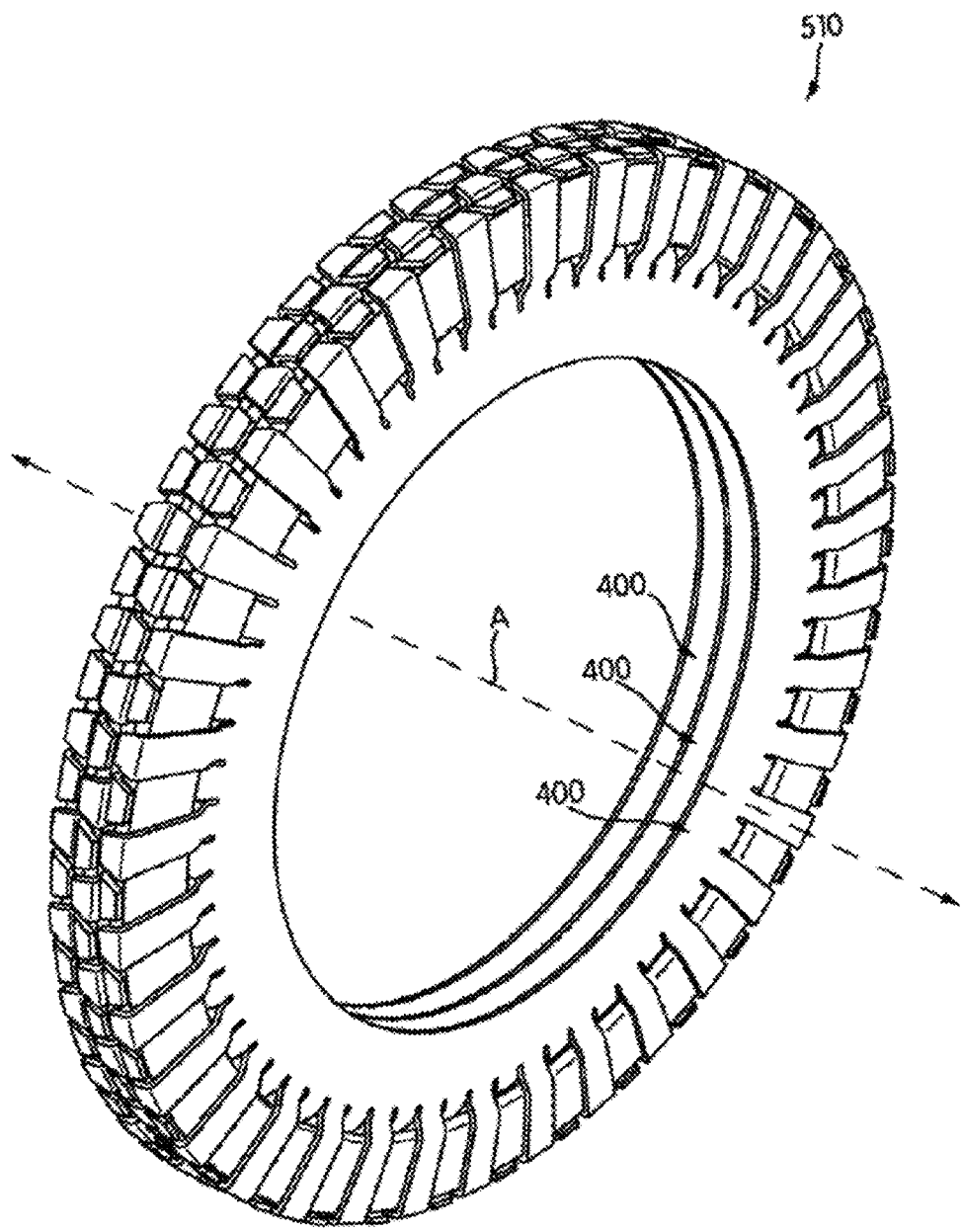

FIG. 7 illustrates an embodiment of a stator formed from a plurality of the stators of FIG. 4.

Figure 8:
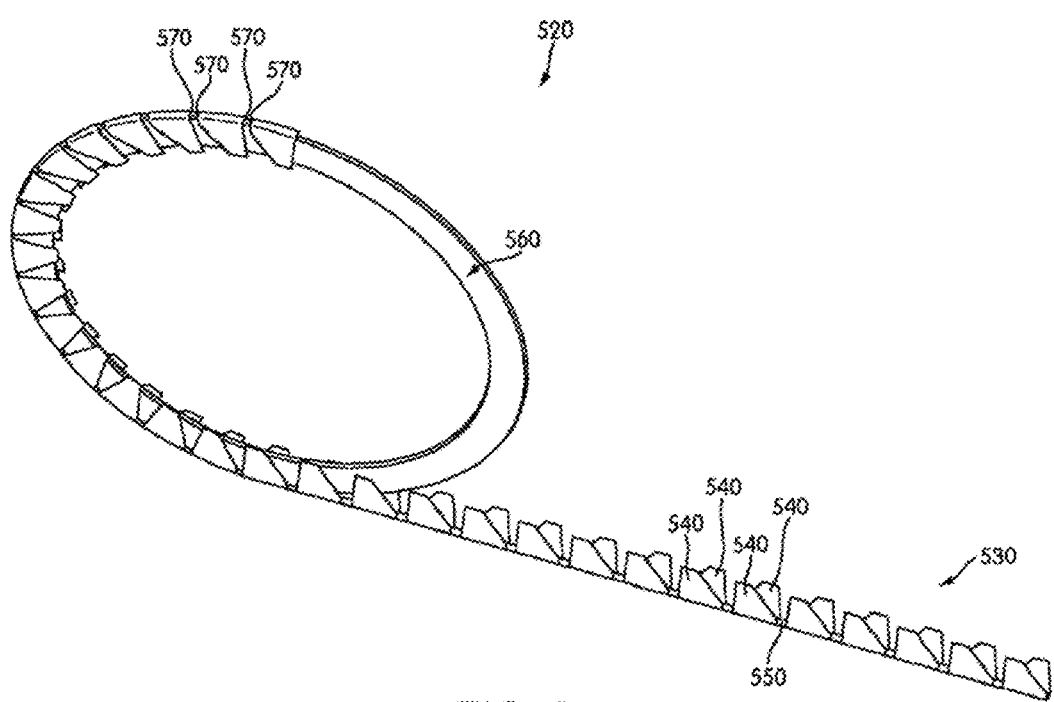

FIG. 8 illustrates an embodiment of a partially assembled stator configured for use with an inner rotor to be positioned therein.

Figure 9A:
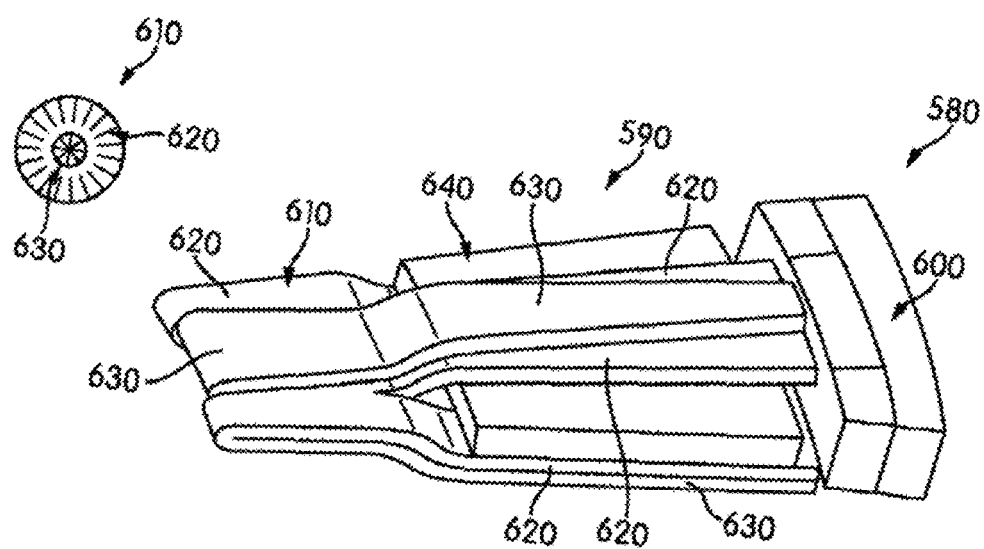
Figure 9B:
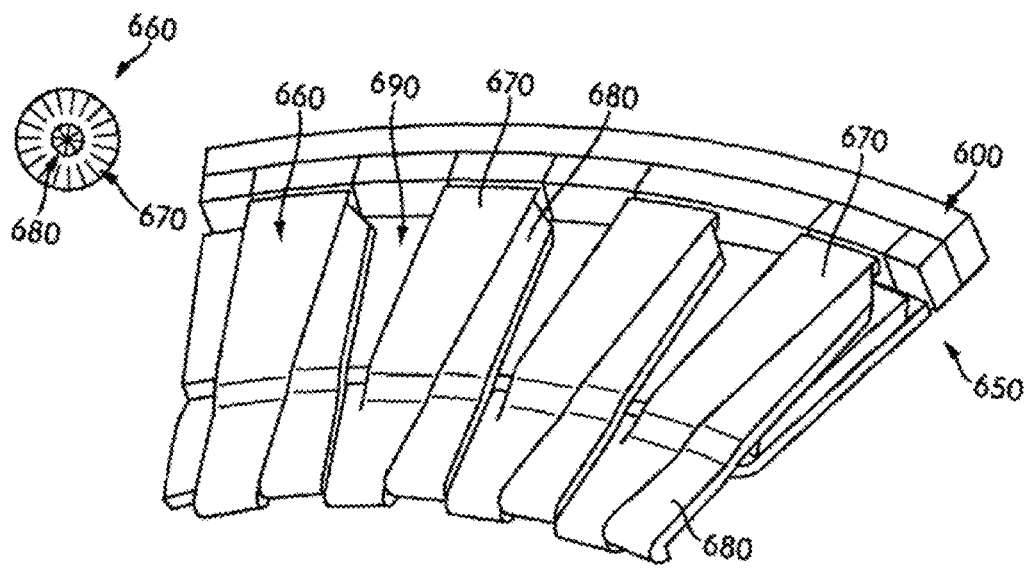

FIGS. 9A and 9B illustrate reduced perspective views of stators formed lamina that utilize folding inner material to the outer portion of the lamina.

Figure 10:
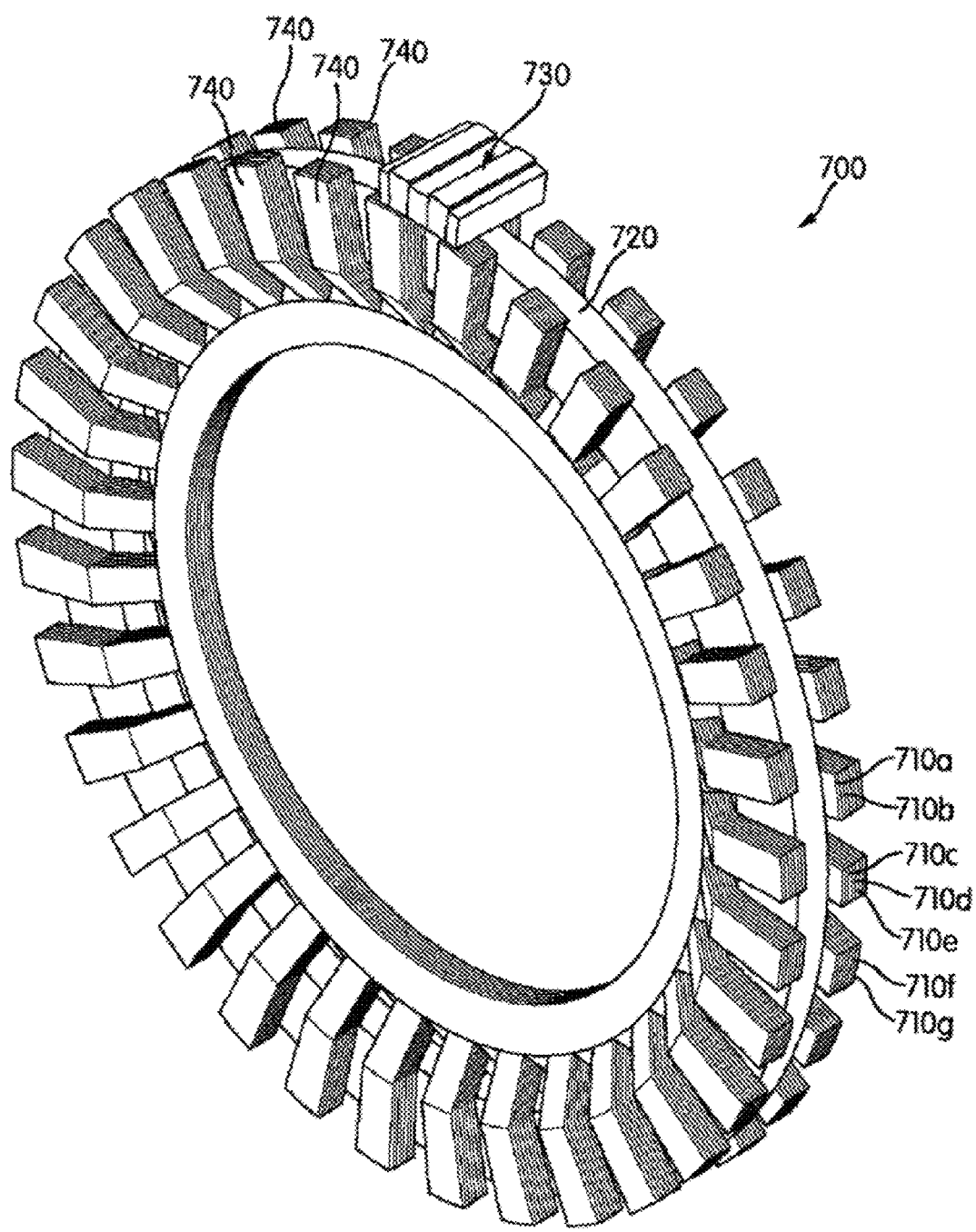

FIG. 10 illustrates an embodiment of a stator formed from a plurality of lamina stacked adjacent to one another, having an outer rotor configuration.

Figure 11:
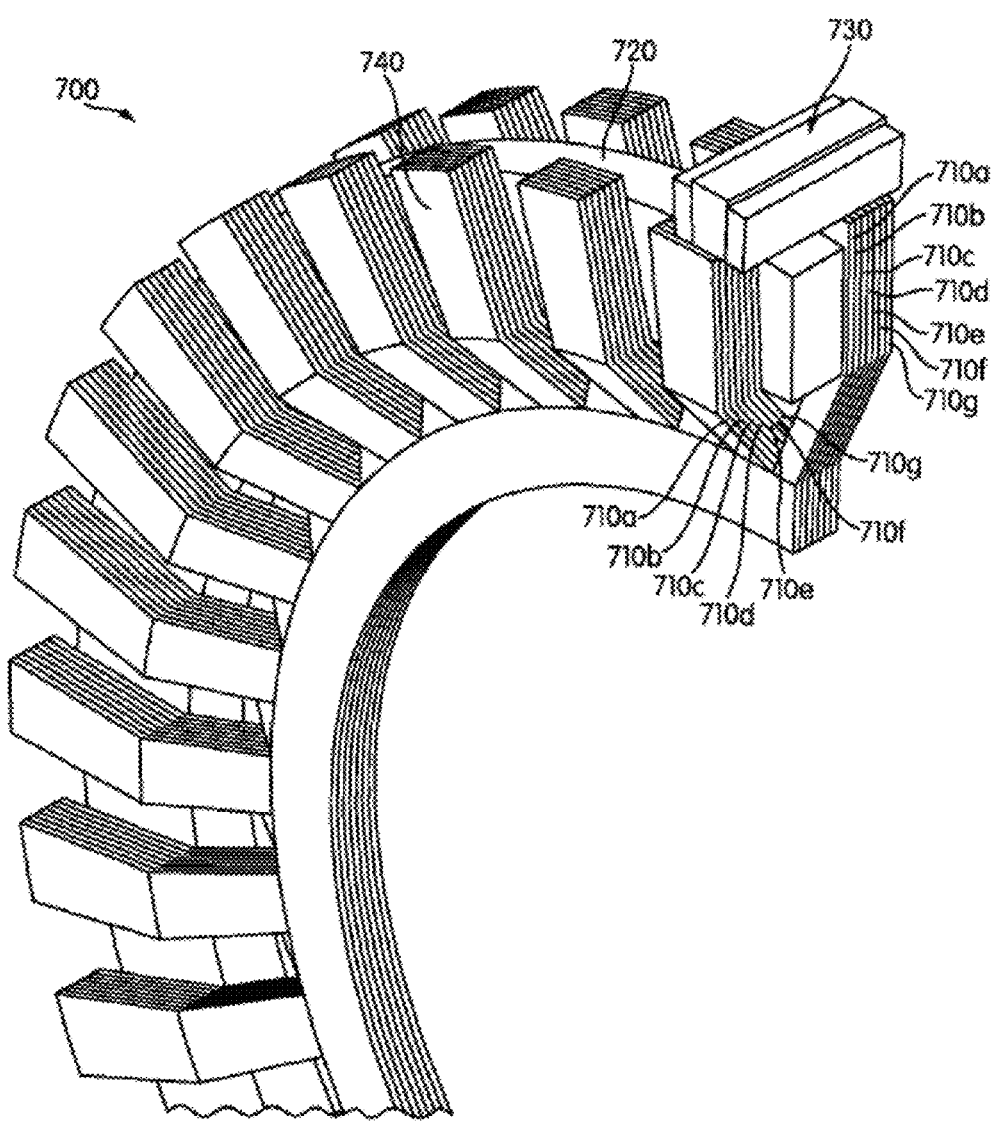

FIG. 11 illustrates a cross sectional view of the stator of FIG. 10.

Figure 12:
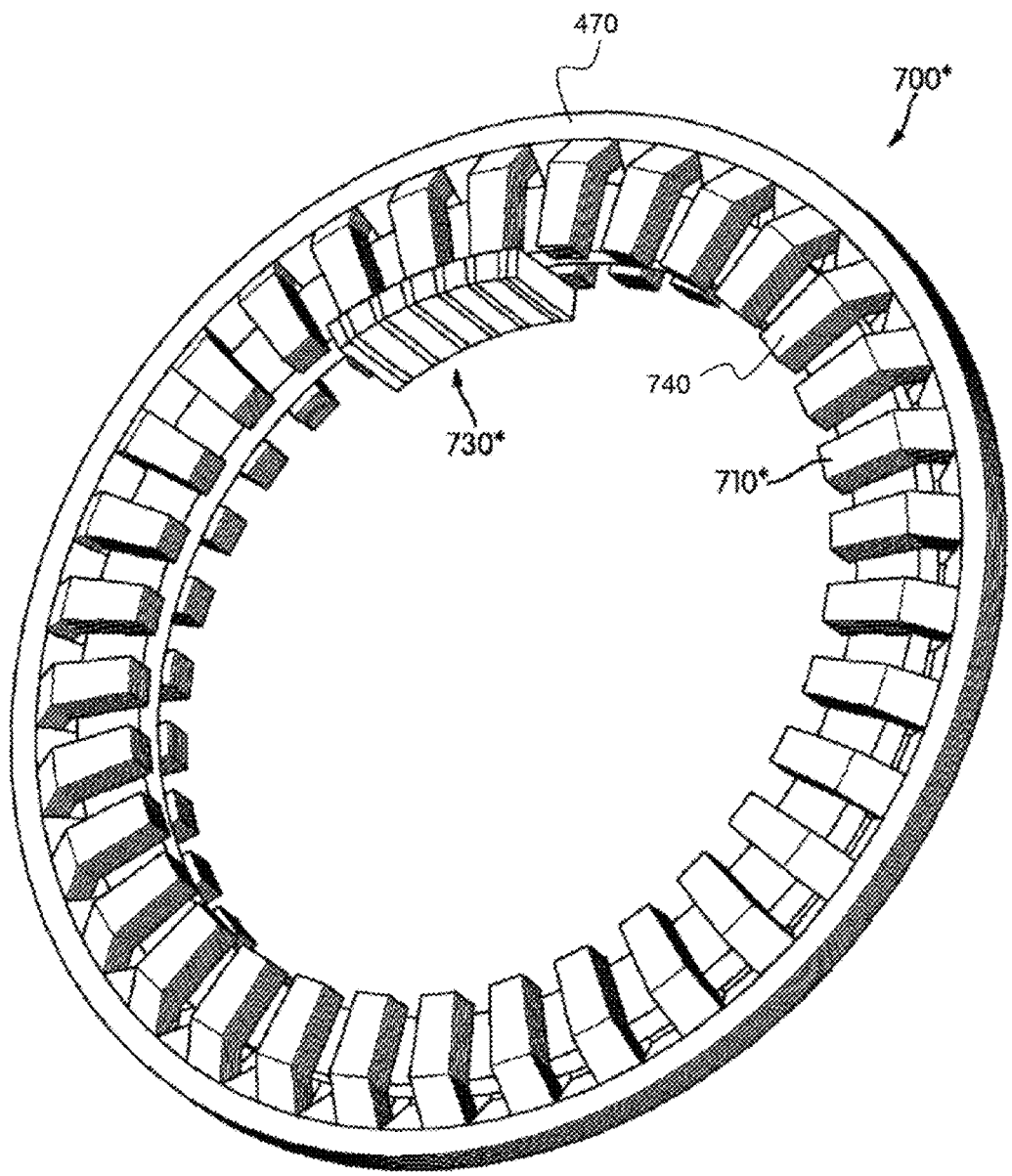

FIG. 12 illustrates another embodiment of a stator formed from a plurality of lamina staked adjacent to one another, having an inner rotor configuration.

Figure 13:
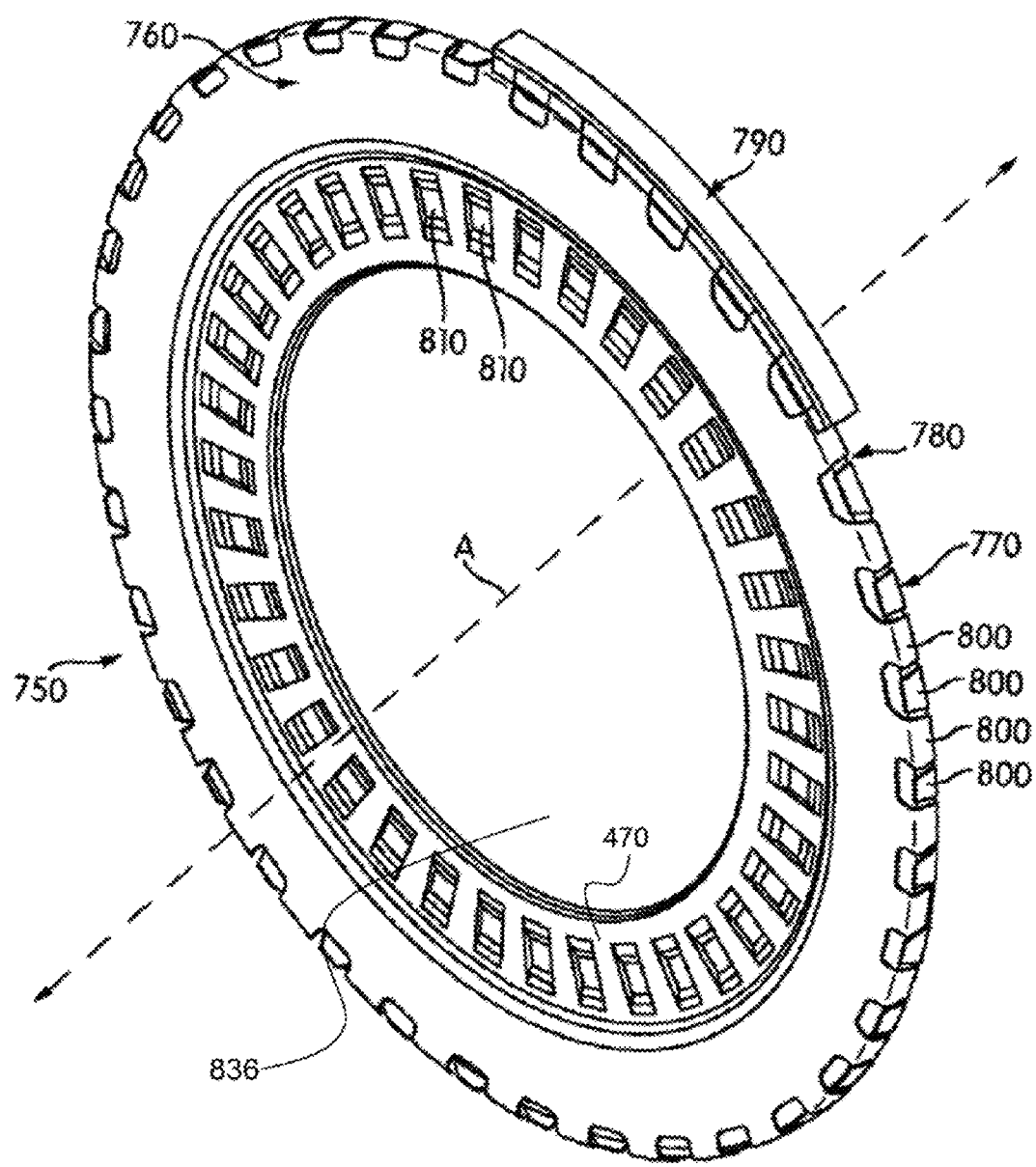

FIG. 13 illustrates another embodiment of a stator of the present disclosure, utilizing a pair of lamina to surround a coil therein.

Figure 14:
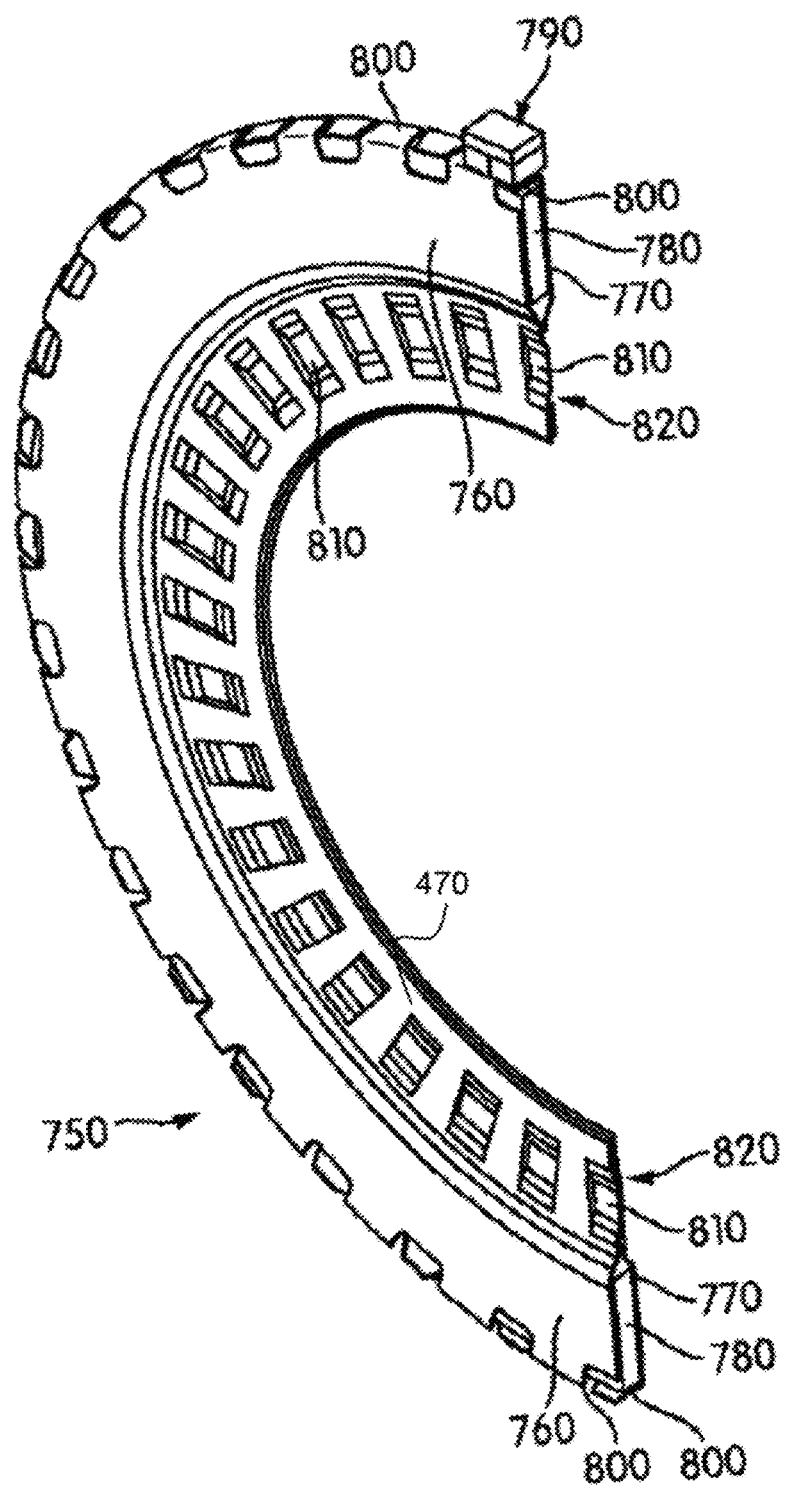

FIG. 14 illustrates a cross sectional view of the stator of FIG. 13.

Figure 15A:
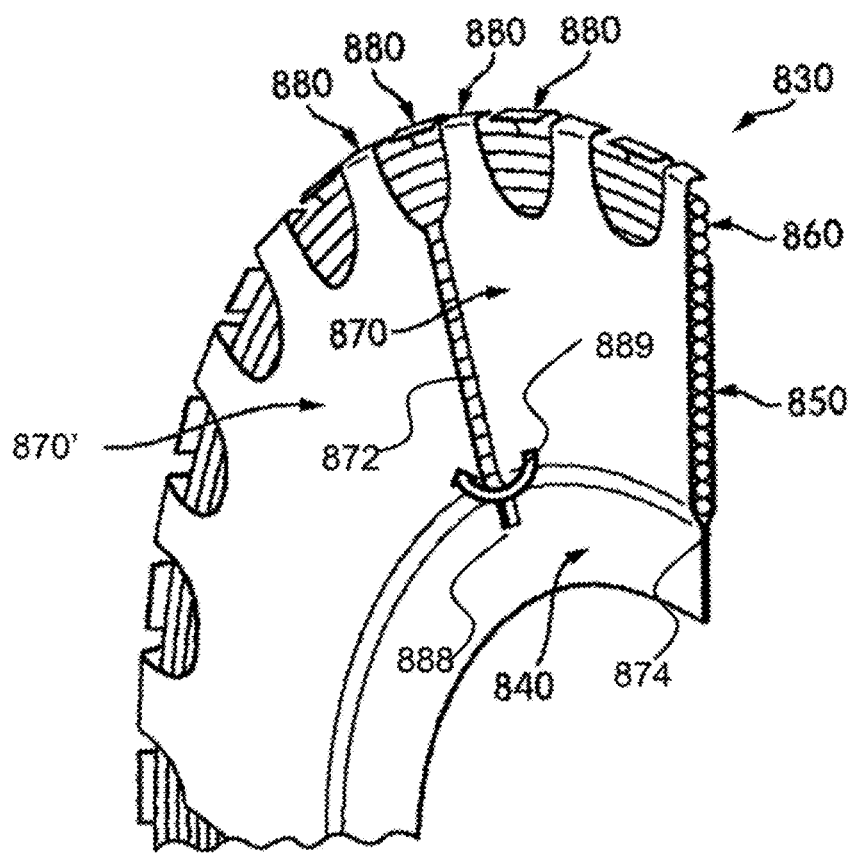
Figure 15B:
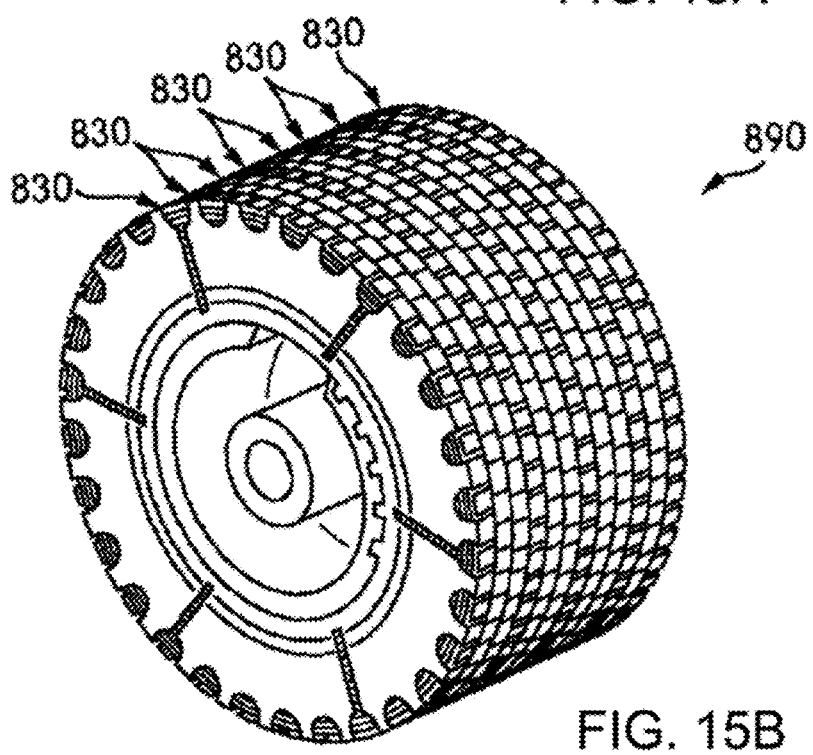

FIGS. 15A and 15B illustrate cross sectional and assembled views of stators of the present disclosure, formed utilizing a pair of lamina to surround a coil, where the stator may be stacked adjacent to other stators to build a larger stator assembly.

Figure 16:
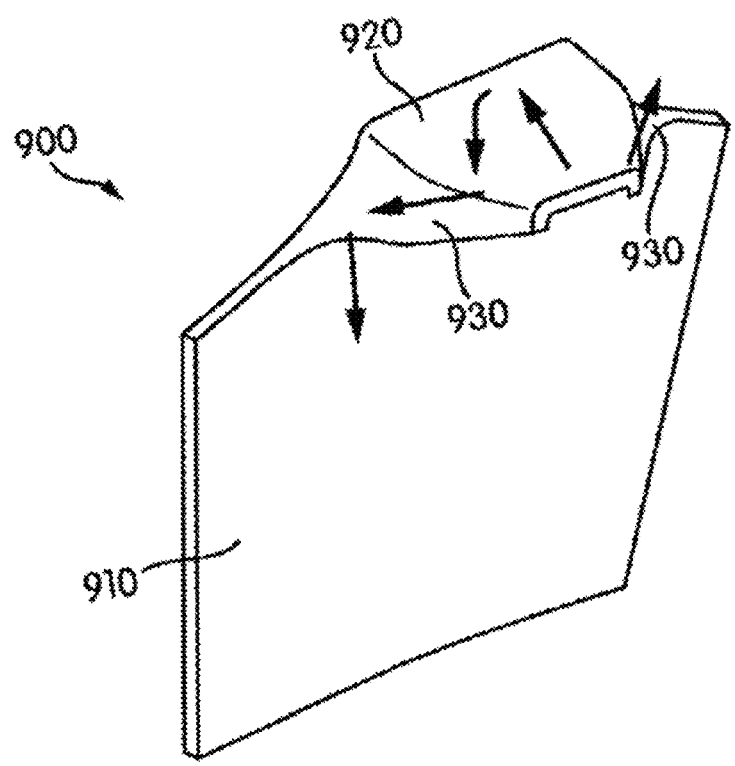

FIG. 16 illustrates an embodiment of a portion of a lamina configured to improve flux paths therein.

Figure 17:
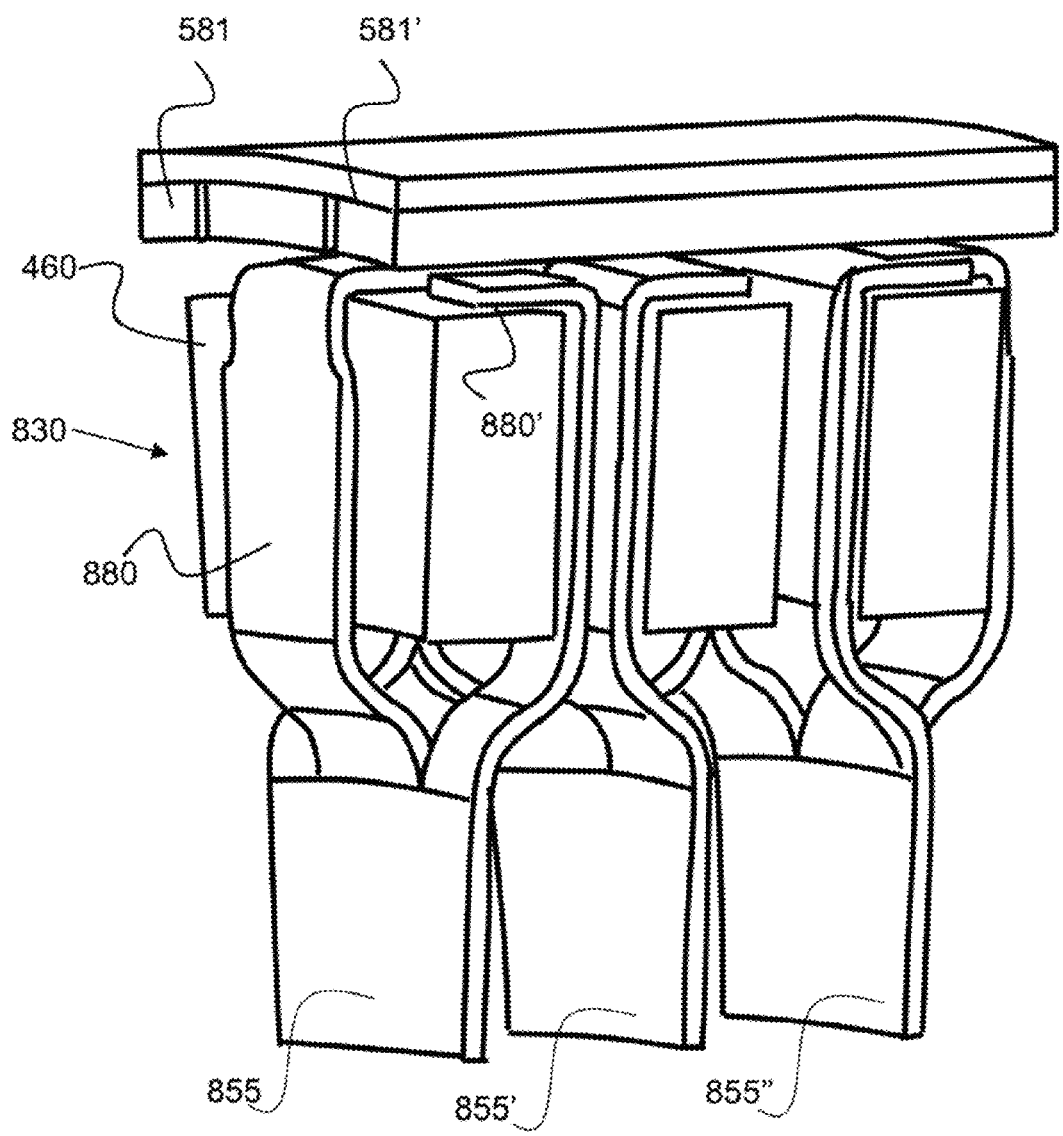

FIG. 17 illustrates an exemplary three-phase motor configuration having three lamina stacked next to each other.

Figure 18:
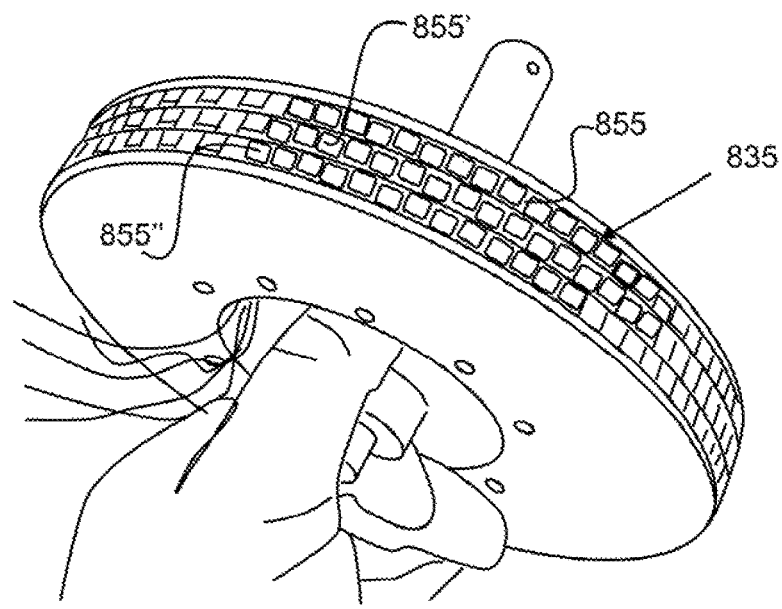

FIG. 18 shows an exemplary three-phase stator assembly.

Figure 19:
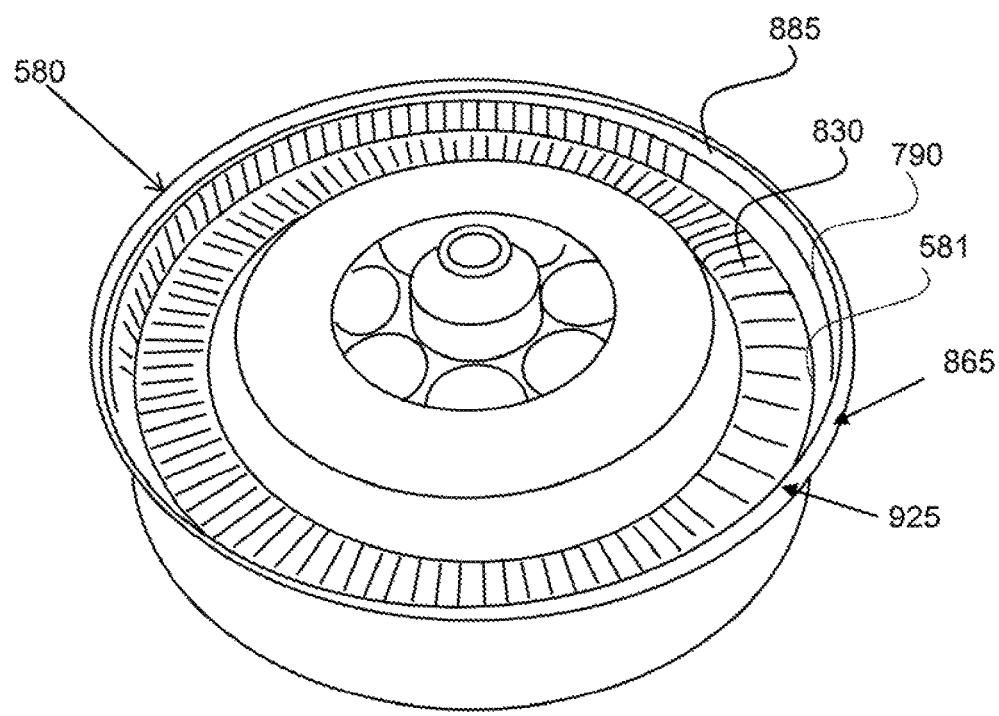

FIG. 19 shows the exemplary three-phase stator assembly of FIG. 18 configured within the rotor.

Figure 20:
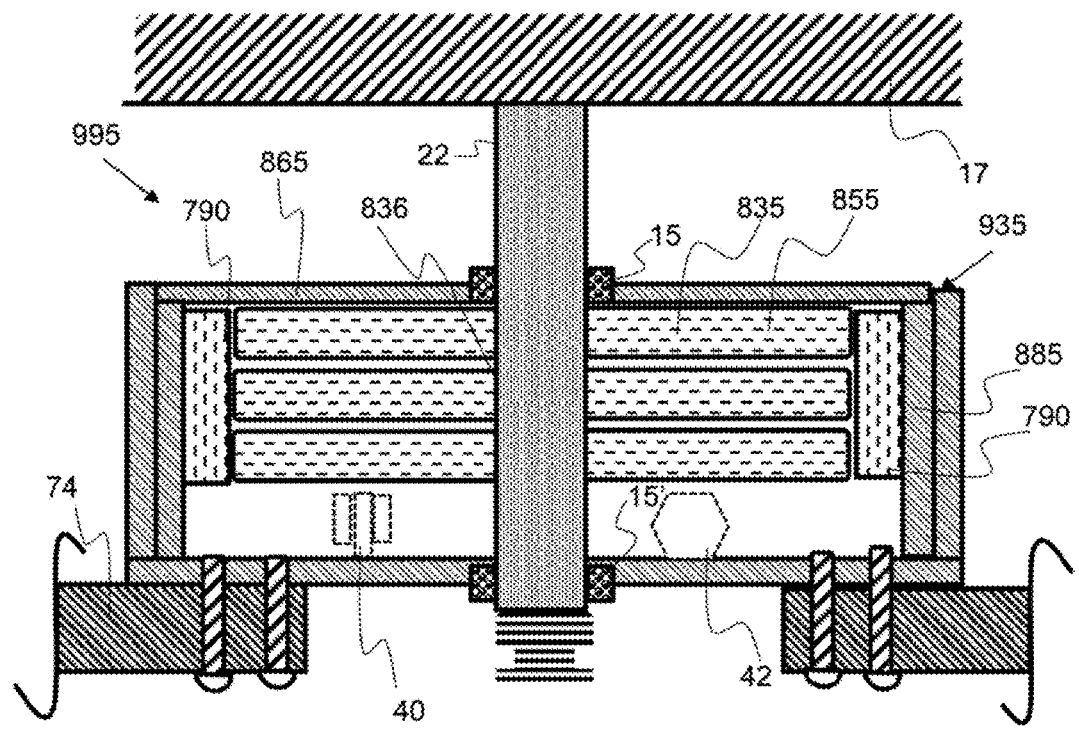

FIG. 20 shows a cross-sectional view of an exemplary high efficiency transverse flux motor fan.

Figure 21:
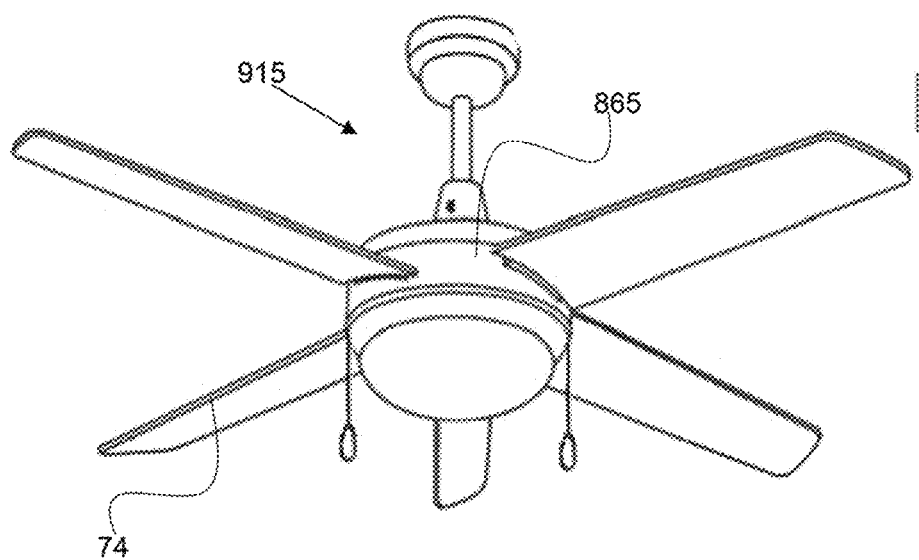

FIG. 21 shows a perspective view of an exemplary residential ceiling fan.

Figure 22:
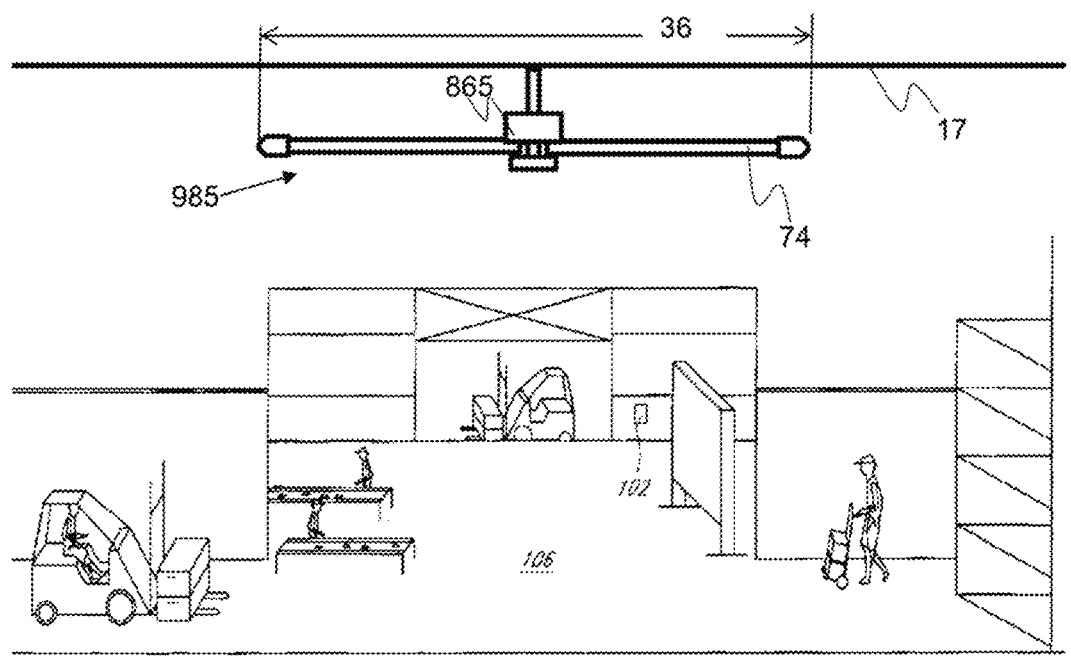

FIG. 22 shows a side view of an exemplary HVLS fan.

FIGS. 23 to 26 show graphs of the mass of motor components as described in Example 1.

Figure 27:
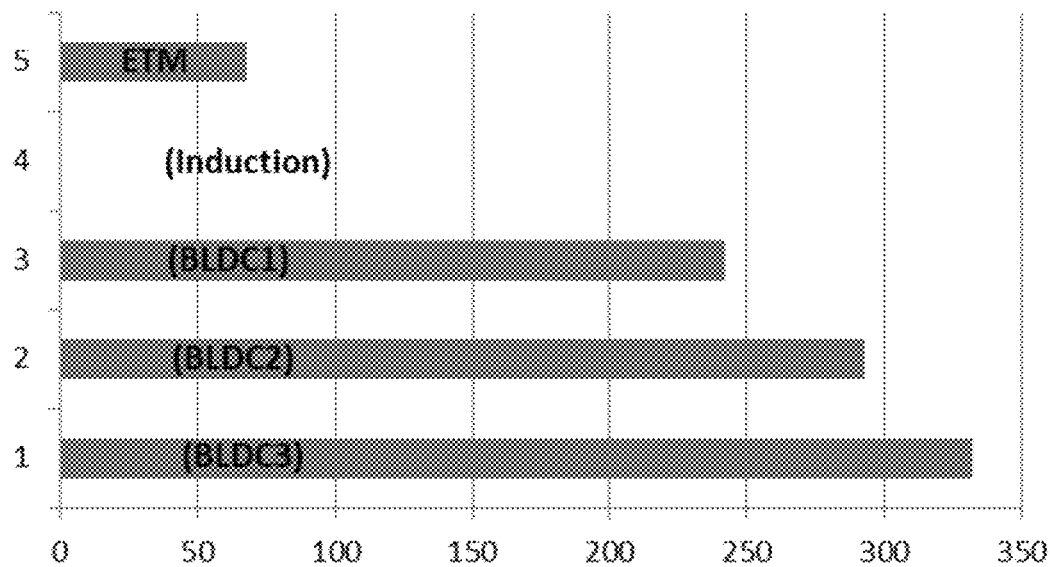
Figure 28:
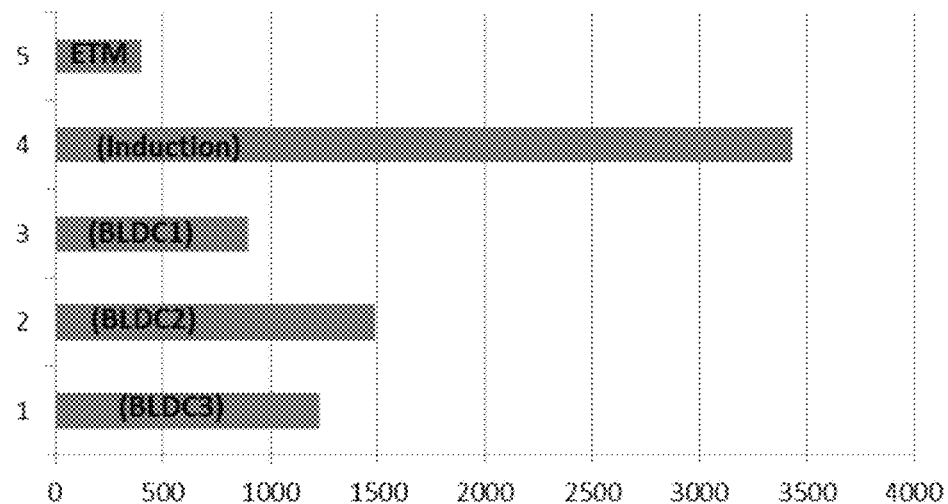
Figure 29:
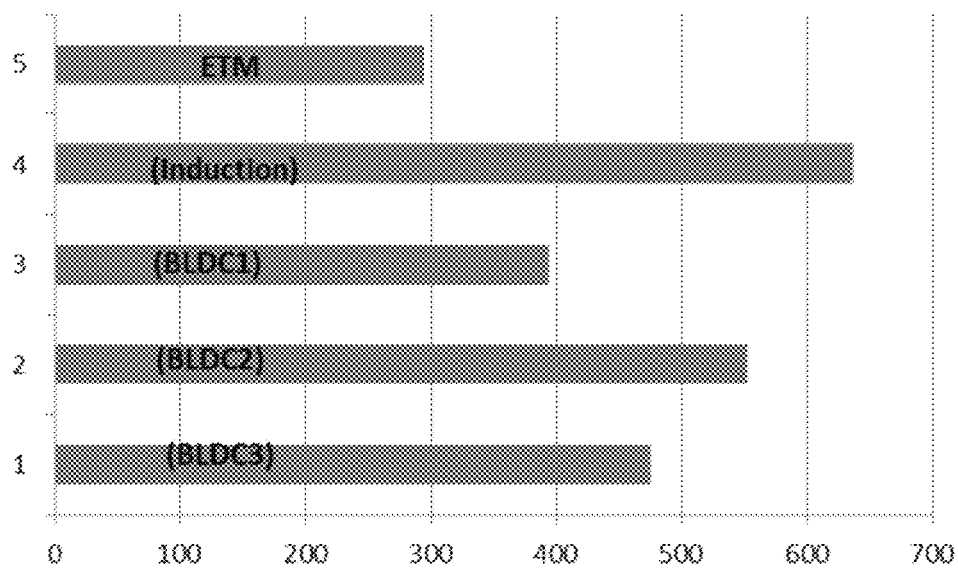

FIGS. 27-29 show graphs of motor component mass to torque ratios, as described in Example 1.

FIG. 30 shows a table of motor component mass and size as described in Example 1.

FIG. 31 shows a table of motor power and CFM output, as described in Example 1.

FIG. 32 shows a table of motor power requirements and power output, as described in Example 1.

FIG. 33 shows a table of motor component mass to motor torque, as described in Example 1.

Figure 34:
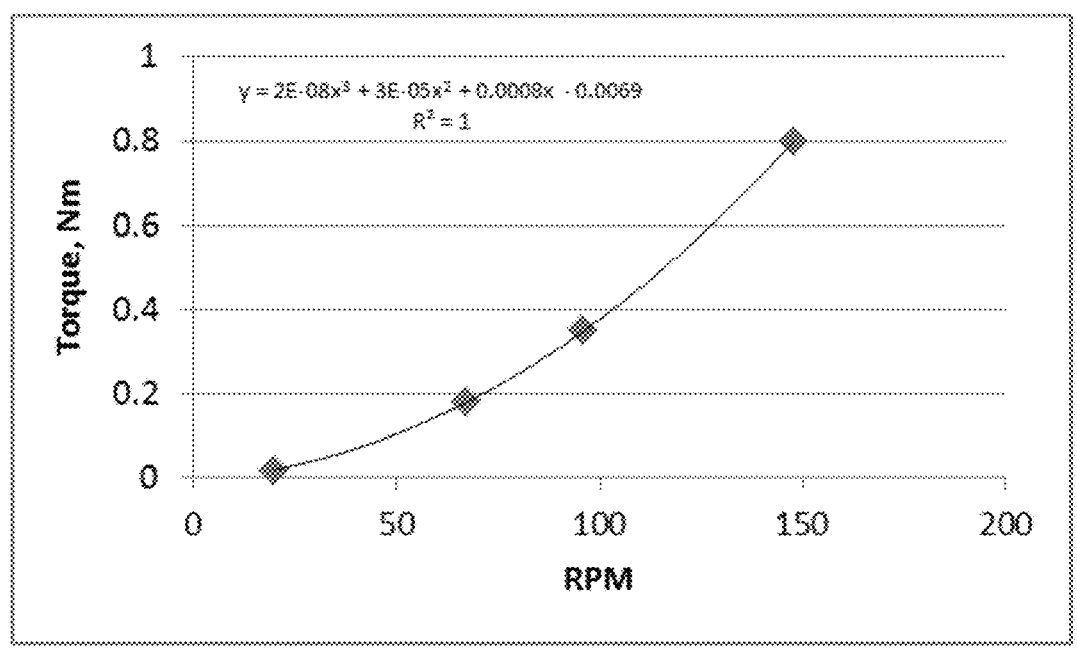

FIG. 34 shows the modeled torque versus RPM for a ceiling fan driven by an exemplary transverse flux motor.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

In accordance with an exemplary embodiment, and with reference to FIG. 1A, an electrical machine, for example a transverse flux machine (TFM) 100A, generally comprises a rotor 150A, a stator 110A, and a coil 120A. The rotor 150A comprises a plurality of interleaved magnets 154 and flux concentrators 152, also referred to as a pole. The rotor 150A is configured to interact with stator 11 OA in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 1 OOA and/or components thereof.

In accordance with an exemplary embodiment, and with reference to FIG. 1B, an electrical machine, for example a commutated flux machine 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

With reference now to FIG. 3A, a flux concentrator 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux concentrator 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Principles of operation for various transverse flux machines and/or commutated flux machines, and various other principles related thereto, may be found in one or more of U.S. Pat. Nos. 7,851,965, 7,923,886, 7,868,508, 8,053, 944, and 8,405,275, U.S. Patent Application Publication Nos. 2011/0169381, 2011/0169366, 2012/0119599, 2012/0119609, 2012/0119610, 2012/0234108, 2012/0235519, 2012/0235668, 2013/0002061, and 2013/0113320, and U.S. patent application Ser. No. 13/969,447. Each of these patents and patent applications are hereby incorporated herein by reference in its entirety. It may be appreciated that the present disclosure may suitably be combined with one or more of the teachings in these patents and printed publications. For example, principles of the present disclosure may suitably be combined with principles electric motor design and components, including but not limited to those therein.

As described in U.S. Pat. No. 8,405,275, incorporated herein by reference in its entirety, a stator for an electrical machine, such as a transverse flux machine and/or commutated flux machine, may comprise a lamination stack (e.g., a plurality of lamina) formed from a generally planar material configured to transmit magnetic flux. Such lamina may be in a shape configured to facilitate transmission of magnetic flux in a desired manner and/or direction. In an embodiment, the lamina may be assembled side by side into the lamination stack (e.g., as side laminations). In various exemplary embodiments, lamina may comprise a generally ring-shaped structure. It may be appreciated that the ring shaped structure may be arcuate, polygonal, a combination thereof, or of any other appropriate shape or configuration. Moreover, such lamina may be configured with one or more teeth. In an exemplary embodiment, teeth are located on the outer edge of the lamina and/or on the inner edge of the side lamination. In various exemplary embodiments, teeth may be disposed to generally face the radial interior of the ring (for example, in connection with the use of an "inner" rotor in a radial gap configuration), the radial exterior of the ring (for example, in connection with the use of an "outer" rotor in a radial gap configuration), and/or an axial side of the ring (for example, in connection with the use of a "side by side" rotors and stators in an axial gap configuration).

The lamina typically comprise a material suitable for transmission of magnetic flux. In various exemplary embodiments, lamina may comprise silicon steel. In an exemplary embodiment, the lamina may comprise M19 silicon steel. Lamina may also comprise cold rolled grain oriented ("CRGO") silicon steel, nickel-based alloys (e.g., Carpenter brand high-permeability "49" alloy and/or the like), cobalt-based alloys (e.g., Carpenter brand "Hiperco" cobalt-based materials and/or the like), nickel-cobalt alloys, and/or the like. Moreover, lamina may comprise any suitable material having a desired electrical resistivity and/or magnetic permeability.

Other details regarding assembly of the lamina into a stack, which may be assembled into a stator for an electrical machine, are also described in U.S. Pat. No. 8,405,275. It may be appreciated that the teachings therein may be utilized for a rotor of an electrical machine as well. As further described therein, when utilized in certain electrical machines, continuous (for example, ring-shaped) lamina and/or lamination stacks can suffer from undesirable losses due to flux linking of certain lamina, as explained in more detail below. Stated generally, in certain electrical machines, including in transverse flux machines and/or commutated flux machines, any component or combination of components which provide a closed electrical circuit passing through a magnetic flux loop will have an electric current induced therein responsive to variations in the magnetic field. Typically, it is desirable to induce an electrical current in a conductive coil of an electrical machine (i.e. a portion of the electrical machine intended to supply an output current and/or provide an input current), but undesirable to induce an electrical current in other portions of the machine (e.g., portions of the rotor and/or stator intended to facilitate switching of magnetic flux). Such currents induced outside a conductive coil can lead to unwanted eddy currents, thermal losses, and even device failure.

Accordingly, to mitigate the effects of eddy currents and other such unwanted results, U.S. Pat. No. 8,405,275, describes modifying lamina to interrupt a continuous electrical circuit therein. Specifically, the lamina may include one or more cuts or gaps, therein, which may extend completely through the side lamination, breaking the electrical circuit. In some embodiments, the lamina may be formed from spaced segments that are circumferentially arranged to form a generally ring-shaped structure in a transverse flux machine. Each segment may be partially electrically and/or physically separated from one another, either by cutting a generally ring-shaped lamina into segments, or forming the generally ring-shaped lamina from segments. As stated therein, however, while a larger number of cuts or segments more effectively interrupt electrical paths around a lamination stack, the complexity associated with manufacturing such lamination stacks and/or integrating such laminations stacks into a functional electrical machine may also grow with the number of cuts or segments. Accordingly, various mechanisms of joining lamina and maintaining cuts therein are described therein. Additionally, as the number of cuts grows, the voltages induced in the lamina of the lamination stacks are reduced, as each lamination stack extends a shorter angular distance around a transverse flux machine and is thus linked by less magnetic flux. Other techniques of mitigating the effects of eddy currents, such as by utilizing physically unified conductive segments, which may be electrically and magnetically segmented into discrete units in a manner that prevents formation of induced eddy currents (e.g., circumferential currents) in the stator, are described in U.S. patent application Ser. No. 13/969,447, incorporated by reference above.

FIG. 4 illustrates a transverse flux stator 400 formed with a single lamina 410 such as a sheet of metal including silicon steel or another suitable material having a desired electrical resistivity and/or magnetic permeability, including but not limited to those materials described above. In an embodiment, the single lamina 410 may be formed from a single piece of stamped steel. As described herein, the single lamina 410 may have various geometric configurations in various embodiments, facilitating a variety of motors based thereon. In an embodiment, multiple lamina 410 may be formed simultaneously. For example, the multiple lamina 410 may be formed by placing multiple sheets of lamination material on top of one another, then stamping the sheets by a die corresponding to the desired shape of a lamina 410. Subsequent shaping of the lamina 410 (e.g., bending or shaping of portions of the lamina 410) may commence simultaneously with or subsequent to the stamping.

In the illustrated embodiment, the single lamina 410 may initially be formed (e.g., through a stamping process) as an annular lamina having an inner portion 420 and an outer portion 430 relative to a central axis A. It may be appreciated that the central axis A may be an axis of rotation for the rotor associated with the transverse flux stator 400 (not shown in FIG. 4). In an embodiment, radial cuts into one or more of the inner portion 420 and the outer portion 430 may be utilized to form opposing pairs of teeth (e.g., terminal protruding portions of stator material) and associated flux paths. For example, in the illustrated embodiment, the outer portion 430 of the single lamina 410 is cut or otherwise formed (such as in the stamping process) with a plurality of gaps 440 defining a plurality of radially extending members 450 which may form the teeth. Although the members 450 extend radially relative to the axis of rotation of the rotor in the illustrated embodiment, it may be appreciated that in some embodiments the members of the single lamina 410 may be configured to extend along the axis of rotation, e.g., for a radial gap configuration of stator. While in the illustrated embodiment the gaps 440 are generally linear, in other embodiments, the gaps 440 may have a curved or angled configuration. As shown in FIG. 4, adjacent radially extending members 450 may be bent or otherwise angled in opposing axial directions, so as to form a space that may receive a coil assembly 460 therein, as described in greater detail below. That is, the angles of the radially extending members 450 are alternated so that every other radially extending member 450 is on each axial side of the space for receiving coil assembly 460. While in some embodiments each of adjacent radially extending members 450 may be bent to form the space, in some embodiments, alternate ones of the extending members 450 may be bent, while others alternate ones of the extending members 450 may be generally planar with the uncut portion of the single lamina 410. It may be appreciated then that the single lamina 410 may include a stem portion 470 from which the radially extending members 450 may extend radially from and at least some of which may protrude axially outwards relative to the axis A to define the volume of the space to receive the coil assembly 460.

As shown in the view of FIG. 5, in an embodiment, each of the radially extending members 450 may be bent away from a space therebetween that may house the coil assembly 460. In some embodiments, the coil assembly 460 may comprise elements or assemblies configured to selectively generate electromagnetic forces in the lamina 410, and may include structures appurtenant thereto. For example, in some embodiments a coil channel 480 may be placed in the space between the radially extending members 450, and a coil 490 may be wound around the transverse flux stator 400 within the coil channel 480 to form the coil assembly 460. In other embodiments, the coil 490 alone, or other configuration of coil assembly 460, may be positioned within the space between the radially extending members 450 directly. In an embodiment, the coil channel 480 may be formed from one or more pieces which may form a groove into which the coil 490 may be wound into. For example, the coil channel 480 may be formed from one or more pieces of insulating material (e.g., plastic, such as formed nylon, or another polymer), which may be secured together (e.g., via pins, snaps, welds, adhesive, or other securements) to form an annular channel into which the coil 490 may wind. It may be appreciated that the application of electric current to the coil in the coil assembly 460 may generate flux fields in the lamina 410 causing rotation of the rotor. Similarly, in some embodiments the application of a moving/variable magnetic force to the transverse flux stator 400 may generate an electric current in the coil of the coil assembly 460 (e.g., in the context of a generator).

As shown in FIG. 6, which illustrates a cross sectional view of the transverse flux stator 400 from FIG. 4, in an embodiment the radially extending members 450 may be bent close to the coil assembly 460 (e.g., after it is placed in the space, or bent initially to form a close configuration of the space, with the coil assembly 460 installed therein). In an embodiment, heads 500 of the radially extending members 450 may interleave with one another to form flux concentrating teeth which may surround the coil assembly 460 therein. Although not beholden to any particular theory of operation it may be understood that the arrangement and configuration of the stator 400 forms desired flux paths when the coil assembly 460 is activated (e.g., through electromagnetic processes, with electric current passing through the coil 490 in the illustrated embodiment). It may be appreciated that the radially extending members 450 may be angled or positioned relative to one another to form the desired flux paths (including but not limited to forming a polyphase configuration, implementing a phase offset, or so on).

FIG. 7 illustrates a perspective view of a multiphase stator assembly 510 formed from a plurality of the transverse flux stators 400 positioned adjacent to one another along the axis A. It may be appreciated that the plurality of transverse flux stators 400 in the stator assembly 510 may be utilized in conjunction with an associated rotor assembled concentric thereto. It may be appreciated that in an embodiment the power of the motor may be scalable through use of additional transverse flux stators 400 in the stator assembly 510, utilizing a common rotor.

While the embodiment of FIGS. 4-7 depict a transverse flux stator configured as an inner stator that would be utilized with an exterior rotor, or outer rotor configuration to surround and rotate about the inner stator, it may be appreciated that in some embodiments the teachings herein may be utilized to construct a transverse flux stator configured to be utilized as an exterior stator for use with an interior rotor configured to rotate within the exterior stator. For example, as illustrated in FIG. 8, a transverse flux stator 520 configured to be utilized with an interior rotor may be formed from a strip of stator material 530 which may be cut, die pressed, or otherwise formed in an elongated manner configured to form a plurality of radially extending members 540. As shown, the radially extending members 540 may protrude from a connecting portion 550. As shown, the strip of stator material 530 may be wound around a coil assembly 560, which may be positioned within a channel defined by opposing radially extending members 540 on opposite sides of the connecting portion 550. In an embodiment, the coil assembly 560 may be similar in configuration to the coil assembly 460, and may comprise a coil, which may be wound within a coil channel. It may be appreciated that in some embodiments the coil may be of a unitary construction around which the strip of stator material 530 is positioned. In an embodiment where the coil assembly 560 comprises a coil channel, the coil channel may itself be of a unitary construction.

As shown in the illustrated embodiment of the transverse flux stator 520, the connecting portion 550 may be formed with thinner regions 570 thereon (e.g., pressed to a reduced thickness, or containing perforations) configured to facilitate wrapping the strip of stator material 530 around the coil assembly 560. It may be appreciated that in some embodiments, head portions may be formed on the radially extending members 540, similar to the head portions 500, which may be folded inward over the coil assembly 560, creating flux concentrating teeth that may interleave with one another to secure the strip of stator material 530 around the coil assembly 560, and form desired flux paths when the coil assembly 560 is activated (e.g., current is passed through the coil), to engage the inner rotor associated with the transverse flux stator 520. In other embodiments, such as that illustrated, the tip of each radially extending member 540, generally without being bent relative to the remainder of the radially extending member 540, may be utilized to form the desired flux path for the transverse flux stator 520. It may also be appreciated that the connecting portion 550 or the radially extending members 540 may be angled or positioned relative to one another to form the desired flux paths (including but not limited to forming a polyphase configuration, implementing a phase offset, or so on).

Although the embodiment of FIG. 8 illustrates the transverse flux stator 520 being formed from a strip of stator material 530, it may be appreciated that in an embodiment, the transverse flux stator 520, being configured for use with an inner rotator, may be formed from a stamped lamination having a annular configuration with cuts or gaps formed in the inner portion of the annulus to form radially extending members extending in alternating axial directions to form the opposing pairs of teeth and associated flux paths. In some embodiments, segments of the inner portion of a single lamina may be cut (e.g., as part of a press stamping process, or otherwise) and folded towards the outer portion of the single lamina to form an annulus configuration. For example, FIG. 9A illustrates a reduced sectional perspective view of an embodiment of a transverse flux motor 580 with segments of a stator 590 and an associated rotor 600 shown therein. As shown, the stator 590 may be formed from a single lamina 610 shaped by cutting (or otherwise forming) an annulus having an outer portion 620 and an inner portion 630, wherein the outer portion 620 is bent outwards to form a space for a coil assembly 640, which may be similar to the coil assemblies 460 and 560, as described above. As shown in the illustrated embodiment, however, segments from the inner portion 630 may be folded outwards over the outer portion 620, to increase the available flux path area. Specifically, by folding the inner lamination material from the inner portion 630 alongside the outer portion 620, the size of the flux path may be increased. As further shown in FIG. 9B, in an embodiment a transverse flux stator 650 may be configured as shaped from a single lamina 660, by cutting (or otherwise forming) an annulus having an outer portion 670 and an inner portion 680, wherein the outer portion 670 is bent outwards to form a space for a coil assembly 690, which may be similar to the coil assemblies 460 and 560, as described above. As shown in the illustrated embodiment, however, segments of the inner portion 680 may be folded towards the outer portion 670, and may align adjacent to the outer portion 670 to increase the available flux path area, in a manner that would not increase the thickness of the transverse flux stator 650.

In some embodiments, the single lamina forming both opposing pairs of teeth may be stacked with other lamina that also form both opposing pairs of teeth, to provide additional cross-sectional area for the flux channel. For example, FIGS. 10 and 11 illustrate a transverse flux stator 700 formed from a plurality of lamina 710 (individually lamina 710*a-g*), each of which is configured to surround a coil assembly 720, and form the opposing pairs of teeth for the transverse flux stator 700. In an embodiment, the coil assembly 720 may be similar to the coil assemblies 460 and 560 described above. A reduced view of a portion of a rotor 730 is also depicted. It may be appreciated that in an embodiment each lamina 710 may be formed similarly to the single lamina 410, however in a manner configured for stacking of the lamina 710 adjacent to one another. Accordingly, in an embodiment each radially extending member 740 of the may be lamina 710 may be spaced relative to one another to facilitate the stacking. In an embodiment, certain of the lamina 710 may be different from other of the lamina 710, such as at the radially extending members 740 thereof, to facilitate the stacking of the lamina 710 (e.g., with the radially extending members 740 protruding outwards further than others of the radially extending members to facilitate proper positioning relative to one another, or to create appropriate space for the coil assembly 720). Accordingly, it may be appreciated that the outermost layered tips of the radially extending members 740 of the lamina 710 may together face the rotor 730, and serve as the face of a tooth of the transverse flux stator 700. As shown in FIG. 12, an embodiment of the transverse flux stator 700 (as transverse flux stator 700*) formed from a plurality of the lamina 710 (as lamina 710*) may have an inner rotor stator configuration. A partial view of a rotor 730* configured to rotate within the transverse flux stator 700* is also Illustrated. In this embodiment, the lamina 710 has a stem portion 470 that is configured radially outside of the inwardly radially extending members 740. Other variations of transverse flux stator 700 are also possible in other embodiments.

While in some embodiments the single piece lamina comprises opposing pairs of teeth and associated flux paths (e.g., the unitary body is configured to surround both sides of the coil), it may be appreciated that in other embodiments the stator may comprise a pair of lamina, which when assembled together are configured to sandwich the coil therebetween. For example, FIGS. 13 and 14 illustrate a transverse flux stator 750 formed from a first lamina 760 and a second lamina 770, which together are configured to surround a coil 780, and form the opposing pairs of teeth for the transverse flux stator 750. A reduced view of a portion of a rotor 790 is also depicted. It may be appreciated that in an embodiment each lamina 760 and 770 may be formed similarly to the lamina 410, however in a manner configured for assembly together around the coil 780. Accordingly, in an embodiment each lamina 760 and 770 may include radially extending members 800, which may be bent or otherwise formed to extend in an axial direction parallel to the axis of rotation A for the rotor 790, and thus may envelop the coil 780, as shown. As further shown in FIGS. 13 and 14, in an embodiment each of the lamina 760 and 770 may include features configured to secure the lamina 760 to the lamina 770, or otherwise position the lamina 760 relative to the lamina 770 for assembly into the transverse flux stator 750. As an example, in the illustrated embodiment the lamina 760 includes embossing 810 that extends into apertures 820 in the lamina 770, which may align and/or snap the lamina 760 to the lamina 770. In an embodiment, the embossing 810 and apertures 820 may be outside of the desired flux paths, to prevent undesirable eddy currents or current/flux paths associated therewith. Other mechanisms to secure the lamina 760 to the lamina 770 are also possible in various embodiments, including but not limited to tack or spot welds, pins, snaps, adhesive, or other securements. Lamina 760 and 770 may be attached or secured together in the stem portion 470 to provide a magnetic flux path between the two separate and distinct lamina. As shown in FIG. 13, the ring shaped lamina comprises an aperture 836.

FIGS. 15A-B illustrates another embodiment of a transverse flux stator comprising a pair of lamina surrounding a coil, which may be scalable to provide a desired performance. For example, FIG. 15A illustrates a transverse flux stator 830 comprising a lamina 840 and a lamina 850, which may together surround a coil 860. As shown in the illustrated embodiment, in some embodiments the coil 860 may be formed by wrapping electrically conductive wire within a space formed by the combination of the lamina 840 and the lamina 850. As further shown, in an embodiment one or more of the lamina 840 and/or the lamina 850 may be configured to form segments 870 comprising groups of radially extending segments 880 associated with that lamina. As shown in FIG. 15A, the stator comprises a lamina comprising two separate lamina that are coupled together in the stem portion 888. The segmentation gap 872 in the lamina 840 separates the first segment 870' from the second segment 870 and extends partially into the stem portion 888, as shown in FIG. 15A. An electrical segmentation gap may be gap in the lamina including a cut away portion or slit. In an exemplary embodiment, a segmentation gap extends down into the stem portion through a magnetic flux path portion 889 of the stem portion, as indicated by the bold arrow in FIG. 15 A. An electrical segmentation gap will substantially reduce eddy currents. As shown in FIG. 15B, in an embodiment a plurality of the transverse flux stators 830 may be stacked together to form a multi-phase high performance transverse flux stator 890.

In some embodiments described herein, radially extending members of the stators may be formed by creating gaps between each of the radially extending members, and bending at least a portion of a head of the radially extending member. The bent heads may be folded axially inwards to form alternating heads, which may extend over the coil, and create flux concentrating teeth interleaved with one another to create desired flux paths and flux switches. Examples of such embodiments are illustrated as with the head portions 500 of transverse flux stator 400, or with the head portions of the radially extending members 800 or 880 illustrated in the assemblies of transverse flux stators 750 and 830.

As illustrated in FIG. 16, in other embodiments, the lamina may be constructed through other mechanisms which may create angled or sloped configurations of the head portions of the radially extending members, which may provide an improved flux path from an outermost exterior surface of the head portion to the remainder of the lamina.

In particular, FIG. 16 illustrates a radially extending member 900 which may be integral to other radially extending members on a lamina of a transverse flux stator. In an embodiment, the lamina comprising the radially extending member 900 may be formed utilizing a progressive die press process. In an embodiment, the lamina may be formed through a casting process. As shown, in an embodiment the radially extending member 900 may have a planar portion 910 which may extend radially from an axis of rotation for a rotor associated with the transverse flux stator. A head portion 920 may extend generally axially relative to the axis of rotation, similarly to the head portions of other embodiments described herein. As further shown, however, in an embodiment the radially extending member 900 may include one or more hood portions 930 coupling sides of the head portion 920 to the planar portion 910. As shown, in an embodiment the hood portions 930 may be sloped. In other embodiments, the hood portions may have an angled configuration, or may include a combination of slopes and angles, to extend from the sides of the head portion 920 to the planar portion 910. It may be appreciated that in an embodiment the head portion 920 adjacent to the planar portion 910 may itself have an angled or sloped configuration, such that at least a portion of the head portion 920 slopes or angles towards the planar portion 910, without forming a direct right angle turn from the planar portion 910 to the head portion 920. It may be appreciated that in various embodiments, the head portion 920 may have a plurality of facets associated therewith, and may itself taper inwards, as shown in the embodiment of FIG. 16. It may be appreciated that in an embodiment the radially extending member 900 having the head portions 920 may facilitate flux collection in the air gap between adjacent radially extending members 900.

As shown in FIG. 17, a stator 830 for a three phase motor comprises three separate lamina that are stack adjacent to each other. Each of the ring shaped lamina 855 to 855" are made out of a unitary piece of material wherein the extending members 880 extend to either side of the coil assembly 460. Two poles 581 and 581' are shown configured radially out from the stator.

As shown in FIG. 18, a stator assembly 835 for a three phase motor comprises three individual stators that are stacked adjacent to each other. Each of the three stators comprises a ring shaped lamina 855 to 855".

As shown in FIG. 19, the stator assembly 835, shown in FIG. 18 is configured within a rotor 790. The rotor 790 extends circumferentially around the stator and is contained with a fan housing 865. A back iron 885 comprises a flexible magnet that also extends circumferentially around the rotor. The transverse flux motor 925 is an integral part of the fan housing 865, whereby a portion of the transverse flux motor is attached to the fan housing. The transverse flux motor 580 has 48 poles 581 per phase.

As shown in FIG. 20, a high efficiency transverse flux motor fan 995 comprises a three-phase transverse flux motor 935. The stator assembly 835 comprises three ring shaped lamina 855 having an aperture 836. A mounting rod 22 extends through the aperture and a pair of bearings allows the fan housing 865, attached to the rotor 790, to spin as the rotor is spun by the transverse flux motor. The motor is therefore a direct drive motor, wherein one revolution of the motor creates one revolution of the fan blades. Note that the fan is configured with a direct drive motor and has no gearing between the motor and the fan blades. The ceiling fan is mounted to a ceiling 17 and the fan blades 74 are coupled to the fan housing 865. The controller 40 and power supply 42 are configured within the fan housing but could be configured external to the housing. A back-iron 885 is configured in the fan housing and extends circumferentially around the rotor.

FIG. 21 shows a perspective view of an exemplary residential ceiling fan 915 having four fan blades 74 and a transverse flux motor configured within the fan housing 865. The transverse flux motor may enable the residential ceiling fan to meet any one of the standards for, high efficiency as described herein, including, airflow density, power density and/or airflow efficiency. The transverse flux motor may be an outer rotor configuration and the rotor may be attached to the fan housing 865, thereby providing a direct drive motor configuration wherein the fan blades are coupled with the rotor.

FIG. 22 shows a side view of an exemplary HVLS fan 985 that comprises a transverse flux motor within the fan housing 865, as described herein. The blade diameter 36, or diameter of the circle created by the extended end of a fan blade as the blade rotates, may more than 2.1 m (7 ft). The HVLS fan 985 is configured in a warehouse.

It may be appreciated that the teachings described herein may be applicable to both interior rotor and exterior rotor configurations of stators. In some embodiments, the combination of stator and rotor may be utilized in forming a motor or a generator. It may be appreciated that the rotor may vary across embodiments, and in some embodiments may comprise rubberized or otherwise flexible magnets assembled in an annular configuration to surround or be received within the stator (in inner rotor or outer rotor stator configurations), or in various embodiments of flux concentrating rotors.

It may be appreciated that principles of the present disclosure may suitably be combined with any number of principles disclosed in any one or more of the U.S. patents and/or patent applications incorporated by reference herein. Thus, for example, a particular transverse flux machine and/or commutated flux machine may incorporate use of segmented stator laminations, use of rainbow-like back return laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises." "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A. B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Accordingly, although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

EXAMPLE 1

A comparative analysis was conducted of commercially available residential ceiling fans and a residential ceiling fan configured with a transverse flux motor as described herein. The motor for each fan was disassembled and the components were weighed and measured. In addition, the fans were operated at both airflow rates and power metrics were measured and recorded.

The transverse flux motor was a three phase, 48 pole count outer rotor motor as generally shown in FIGS. 17-19. The transverse flux motor was configured with a unitary ring shaped lamina 855 as shown in FIG. 17.

Four commercially available fans were evaluated. Three of the fans were powered by brushless DC (BLDC) motors and one by an AC induction motor The three BLDC motors evaluated included, Craftmade, model Hathaway (BLDC1) having a 52 inch, (1.3 m) blade diameter, Harbor Breeze, model Kingsbury (BLDC2) having a 70 inch, (1.8 m) blade diameter, and Craftmade, model Olivier (BLDC3), having a 70 inch, (1.8 m) blade diameter. The AC induction motor fan evaluated was Harbor Breeze, model Classic Style (Induction) having a 52 inch, (1.3 m) blade diameter.

Figure 23:
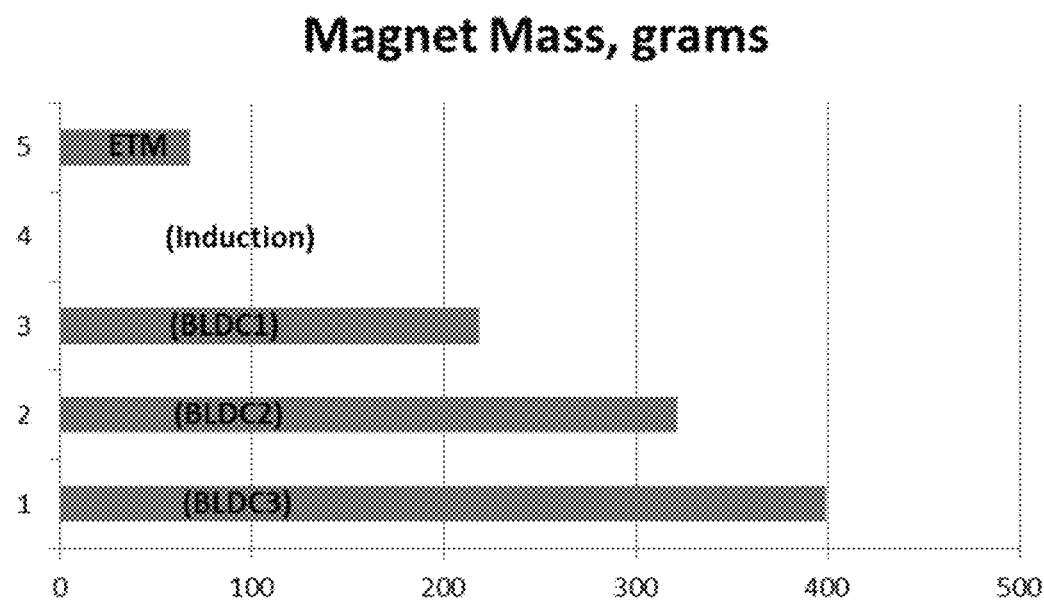
Figure 24:
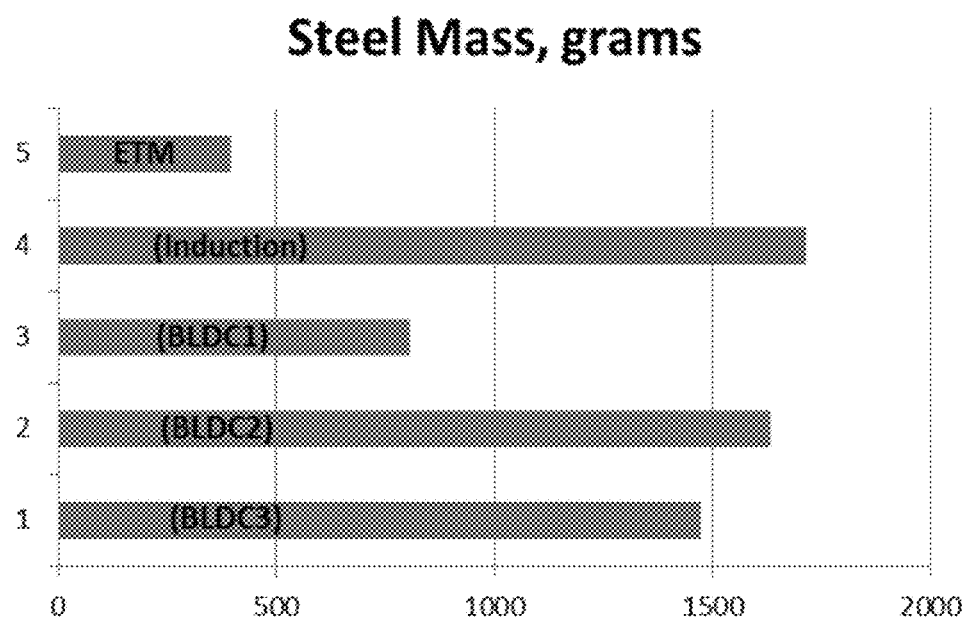
Figure 25:
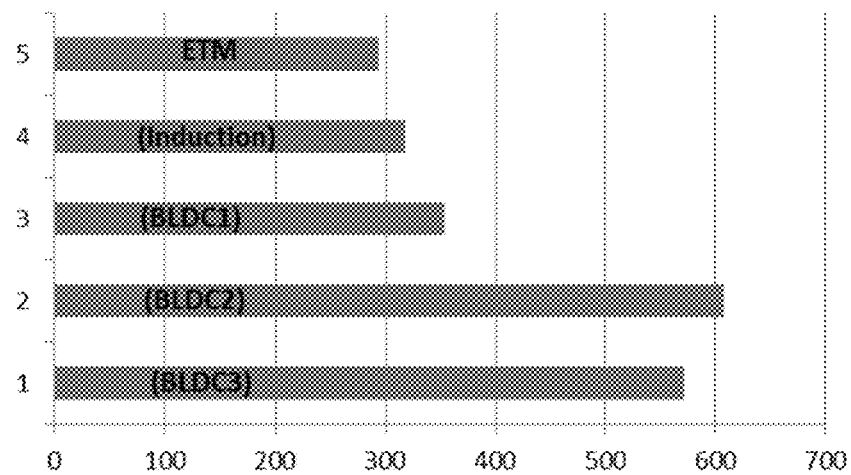
Figure 26:
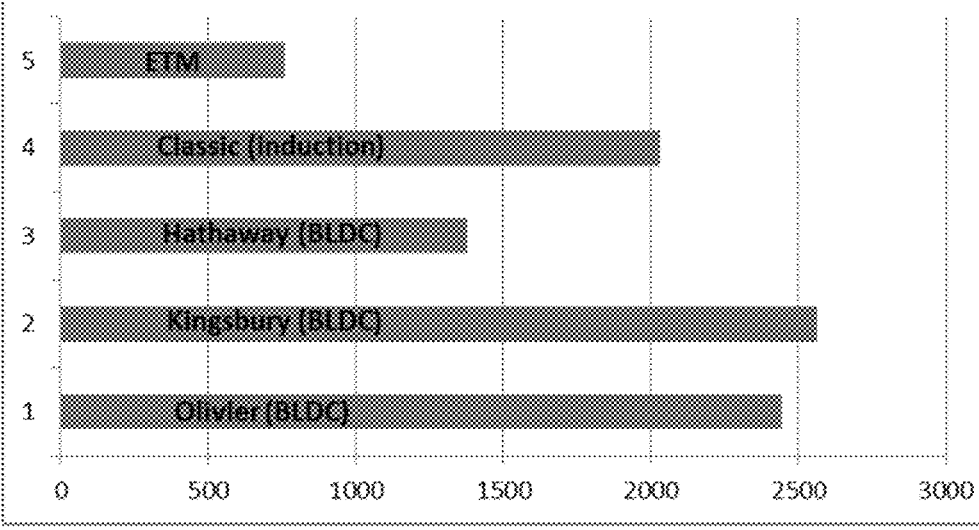

The motors were disassembled and the components were weighed. As expected the commercially available motors were much heavier than the transverse flux motor, as shown in FIGS. 23-25. The essential motor component mass, or the sum of the magnet, steel and copper mass is provided as a graph in FIG. 26. The transverse flux motor had a total essential motor mass of only 758 g. The next lightest essential component motor was the Hathaway with an essential motor mass of 1379 g, or almost double that of the transverse flux motor.

As shown in FIGS. 27-29, the transverse flux motor had a much lower mass to torque ratio for all of the essential motor components. The magnet mass was dramatically lower, only requiring 68 g compared to the 218 g for the BLDC3 motor. This is one third the mass for an equivalent torque output.

FIG. 30 shows a table of motor component mass and size. The phase resistance is also provided in FIG. 30. The phase resistance of the transverse flux motor, Example 1, was only 4.6 ohms, compared with the next lowest being 14 ohms for the Olivier motor, or BLDC 1. The total essential mass for each motor is provided in the last row and is the sum of the copper, magnet and total motor steel mass. The total motor steel mass includes the stator iron mass and back iron mass.

FIG. 31 shows a table of motor power and CFM output, as described in Example 1.

FIG. 32 shows a table of motor power requirements and power output. The transverse flux motor of Example 1 has an equivalent power output with a much lower required power supply. The transverse flux motor is more efficient at converting input power into power output. In addition, the continuous available torque provided by the transverse flux motor was equivalent to the BLDC motors and double that of the induction motor.

FIG. 33 shows a table of motor component mass to motor torque. The transverse flux motor required much less essential motor mass per torque output. A lighter weight motor in a fan, and particularly a ceiling fan, will make installation much easier. A ceiling fan is often times installed by a home owner and lifting a heavy fan while standing on a ladder can be dangerous. A more efficient motor that weighs less would make installation safer.

FIG. 34 shows the model torque of an exemplary transverse flux motor outfitted in a Hunter, Regalia 54044 ceiling fan.

EXAMPLE 2

A Regalia model number 54044 ceiling fan, by Hunter, Memphis, Tenn., was tested and then compared with the same fan configured with a transverse flux motor. The commercially available Regalia fan was outfitted with an AC induction motor requiring 82 watts and producing a maximum airflow of 3112 liters/sec (6,595 CFM). The residential type fan has five blades and a blade diameter of 1.5 m (60 in). The motor dimensions are as provided in Table 1.

TABLE 1

| Motor Dimensions | |
| --- | --- |
| outer diameter of rotor back iron, | 172 mm |
| Stator stack height | 20 mm |
| coil height | 36 mm |
| rotor height | 24 mm |
| axial distance between end bells at OD | 40 mm |

A motor simulation was conducted for a transverse flux motor that would be configured to fit within the fan housing. The specifications of the motor modeled are provided in Table 2.

TABLE 2

| Size | |
| --- | --- |
| Motor OD: | 153 mm (measured at the inner diameter of the end bell) |

TABLE 2-continued

| | |
|---|---|
| Height: | 35 mm (includes coil) |
| | Motor Performance |
| Continuous Torque: | 108 oz-in (.76 N-m) at 500 mApk, 180 RPM |
| No load max RPM: | 800 |
| Torque Constant ($K_t$): | 304 oz-in/Arms (2.15 N-m/$A_{rms}$) |
| Motor Efficiency: | 64% at 180 RPM, 108 oz-in |
| Power Factor: | .87 at 180 RPM, 108 oz-in |
| Resistance: | 38.5 Ohms line-to-line at 25° C. |
| Inductance: | 240 milliHenries |
| Motor Output: | 14.3 Watts |
| Motor Input: | 22.4 Watts |
| Motor Constant ($K_m$): | .286 N-m/Arms/sqrt($R_{3phase}$) |
| Coil Loss: | 6.1 Watts at 180 RPM, 108 oz-in |
| Iron Loss: | 1.3 Watts at 180 RPM, 108 oz-in |
| Poles: | 48 |

As shown in FIG. 34, the torque versus speed for a transverse flux motor as described in Table 2 would provide more than the required torque for the ceiling fan. The motor components for the modeled transverse flux motor would have a lower mass than the standard AC induction motor.

The permanent magnet would weigh 177 g and having the following dimensions: 2.25 mm radial thickness, 25 mm axial, and 473 mm circumference. The material for the magnet would be an Arnold Magnetics Plastiform 2051, MGOe. The pole spacing would be 10 mm center distance from North, N to South, S. The coils would weigh 470 g for all three phases. The coil material would be AWG copper magnet wire and the wire insulation would have UL classification of Class B (temperature 130° C.) or better. There would be 335 turns. The laminations would weight 164 g and there would be three laminations (one per phase). The lamination material would be 0.635 mm thick lamination steel, similar to Tempel FP0250 210.

The stator is a 3 phase design with 1 lamination per phase. Laminations are formed by a combination of stamping (die cutting) and cold-forming. To maximize performance, laminations are cut and formed in a pre-annealed state with annealing after forming. No forming is required after coil winding. Prior to winding, slots shall be insulated with UL recognized electrical grade Vulcanized Fiber (Fishpaper) or similar material. The coils are a simple annulus shape and do not require multi-axis winding machines. Coils can be wound directly onto the stator and all three phase coils can be wound simultaneously. Alternatively, coils can be wound onto laminations prior to stator assembly. Coils are to be secured in place with insulating motor varnish. Stator assembly consists of three laminations attached to the axle shaft There are several options for attachment including a stamped sheet metal hub with tab-in-slot, insert molding, etc. Hookup wire material and termination uses the same methods as existing ceiling fan motors. The simulations show that the thickness of the stamped end bell is sufficient to provide the magnetic back iron for the rotor. Rotor assembly consists of insert molding the flexible ferrite magnetic material to the back iron (end bell). Magnetization of the poles can be performed after the magnet material is bonded to the back iron. The gap between rotor and stator was 0.635 mm in the model. This gap dimension was selected based on ease of manufacturing. Assembly of the motor would be similar to-existing ceiling fan motors.

The modeled transverse flux motor would be able to match or exceed the airflow output of the Hunter's 100 oz-in (0.706 Nm), 180 RPM performance requirement with 177 grams of low cost molded ferrite magnet, three laminations totaling 164 grams and 470 grams of 26AWG magnet wire. From a manufacturing standpoint, this would be a very simple motor with only seven total electromagnetics parts and three single axis coils.

This application incorporates by reference the entirety of U.S. provisional patent application No. 62/108,143, filed on Jan. 27, 2015 and entitled High Efficiency Transverse Flux Motor Fan.

What is claimed is:

1. A fan comprising:
   a. at least two spinning blades configured to spin about a rotational axis;
   b. a transverse flux motor coupled with said at least two spinning blades and configured to rotate said at least two spinning blades about the rotational axis;
   wherein the transverse flux motor comprises:
      a rotor for rotation about a rotational axis;
      a coil arranged circumferentially with respect to and encircling the rotational axis;
   wherein the coil extends in a single plane about the rotational axis; and
      a stator assembly comprising:
         a ring shaped lamina structure formed from and consisting of a piece of planar material and comprising:
            a stem portion formed from said planar material;
            a plurality of gaps in the ring shaped lamina that extend radially from the stem portion to an edge of the ring shaped lamina structure, wherein said gaps form
            a plurality of radially extending members in said planar material that are integral with and extending from said stem portion and configured to form a plurality of opposing extending members about the coil;
   wherein a first set of extending members are configured on a first side of said coil and a second set of extending members are configured on a second, arid opposing side from said first side of said coil;
   wherein the first set and second set of extending members form a coil channel that extends circumferentially with respect to said rotational axis and wherein the coil is configured in said coil channel; and
   wherein the first set of extending members and second set of extending member are formed from the same piece of planar material.

2. The fan of claim 1, wherein the ring shaped lamina structure a unitary piece of material.

3. The fan of claim 2, wherein the plurality of radially extending member are configured in an alternating axial configuration about a coil, wherein a first radially extending member is configured on a first axial side of the coil and a second and adjacent radially extending member to said first radially extending member is configured on a second and opposing axial side of the coil to form a coil channel that extends circumferentially with respect to said rotational axis and wherein the coil is configured in said coil channel.

4. The fan of claim 1, wherein the ring shaped lamina structure comprises:
   a first lamina forming the first set of extending members configured on the first side of said coil;
   a second lamina forming the second set of extending members configured on the second and opposing side from said first side, of said coil;
   wherein said first lamina and said second lamina are magnetically coupled over a radially extending portion of the stem portion.

5. The fan of claim 1, comprising at least one electrical segmentation gap in the ring shaped lamina that extends between two adjoining radially extending members and substantially through a magnetic flux path portion of the stem portion to reduce eddy currents.

6. The fan of claim 1, wherein the plurality of radially extending members are configured in an alternating axial configuration about a coil, wherein a first radially extending member is configured on a first axial side of the coil and a second and adjacent radially extending member, to said first radially extending member, is configured on a second and opposing axial side of the coil to form a coil channel that extends circumferentially with respect to said rotational axis and wherein the coil is configured in said coil channel.

7. The fan of claim 1, wherein the first and second set of extending members each have an extended end and wherein a tooth is coupled with each of said extended ends to form a plurality of teeth that extend axially.

8. The fan of claim 7, wherein a first tooth and an adjacent second stator tooth in a first set of stator teeth are separated, center to center, by a first angular distance, wherein one or more remaining stator teeth in the first set of stator teeth are each separated, center to center, by a second angular distance, the second angular distance being different from the first angular distance, and wherein the first angular distance is computed with a phase offset computed as a fraction of an even distribution angular distance of the first set of stator teeth.

9. The fan of claim 7, wherein the plurality of teeth extend at least partially over the coil.

10. The fan of claim 7, wherein a rotor is located radially inward from the stator assembly.

11. The fan of claim 1, wherein the plurality of radially extending members extend radially out from the stem portion.

12. The fan of claim 1, wherein the plurality of radially extending members extend radially in from the stem portion.

13. The fan of claim 1, further comprising one or more powdered metal portions coupled an extended end of the plurality of radially extending members.

14. The fan of claim 1, wherein the transverse flux motor comprises a first ring shaped lamina structure that is stacked adjacent to a second ring shaped lamina structure in the stator assembly to form a multi-phase electrical motor.

15. The fan of claim 1, wherein the rotor comprises one or more flexible magnets.

16. The fan of claim 1, wherein the fan has an airflow efficiency of more than 236 L/s*W.

17. The fan of claim 1, wherein the transverse flux motor has a power density of more than 150 W/kg.

18. The fan of claim 1, wherein the transverse flux motor has a continuous power density of more than 150 W/kg.

19. The fan of claim 1, wherein the transverse flux motor has at least 30 poles or more.

20. The fan of claim 1, wherein the least the two spinning blades are coupled directly to the rotor.

21. The fan of claim 1, wherein the transverse flux motor is configured as a direct drive motor for the at least two spinning blades, wherein the at least two spinning blades are directly driven by the traverse flux motor with no gear ratio therebetween; whereby one revolution of the motor spins the at least two spinning blades one revolution.

22. The fan of claim 1, wherein the fan is a residential ceiling fan having a blade diameter of no more than 1.9 m.

* * * * *